(12) United States Patent
Armstrong et al.

(10) Patent No.: US 7,987,198 B2
(45) Date of Patent: Jul. 26, 2011

(54) INDICATING RECENT CONTENT PUBLICATION ACTIVITY BY A USER

(75) Inventors: Christopher Armstrong, Sterling, VA (US); Alan Keister, Oakton, VA (US); Lark Dunham, Arlington, VA (US); Jennifer Granito, San Francisco, CA (US); Steven Greenberg, Frederick, MD (US); Rakesh Agrawal, Arlington, VA (US); Michael Sommers, Leesburg, VA (US); Carol A. Glover, Fairfax, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 12/707,159

(22) Filed: Feb. 17, 2010

(65) Prior Publication Data
US 2010/0146054 A1 Jun. 10, 2010

Related U.S. Application Data

(63) Continuation of application No. 11/621,929, filed on Jan. 10, 2007, now Pat. No. 7,783,592.

(60) Provisional application No. 60/757,397, filed on Jan. 10, 2006.

(51) Int. Cl.
*G06F 17/00* (2006.01)

(52) U.S. Cl. ......... 707/781; 707/782; 707/784; 707/786

(58) Field of Classification Search .................. 707/781, 707/782, 784, 786
See application file for complete search history.

(56) References Cited

U.S. PATENT DOCUMENTS

| | | |
|---|---|---|
| 5,999,932 A | 12/1999 | Paul |
| 6,249,282 B1 | 6/2001 | Sutcliffe et al. |
| 6,853,982 B2 | 2/2005 | Smith et al. |
| 6,895,551 B1 | 5/2005 | Huang et al. |
| 7,433,876 B2 | 10/2008 | Spivackk et al. |
| 7,454,357 B2 | 11/2008 | Buckwalter et al. |
| 7,478,078 B2 | 1/2009 | Lunt et al. |
| 2001/0013050 A1 | 8/2001 | Shah |
| 2002/0169743 A1 | 11/2002 | Arnold et al. |

(Continued)

FOREIGN PATENT DOCUMENTS
WO 2006/102261 9/2006

OTHER PUBLICATIONS

International Search Report and Written Opinion, International Application No. PCT/US07/00548, dated Feb. 12, 2008 (13 pages).

(Continued)

*Primary Examiner* — Sana Al-Hashemi
(74) *Attorney, Agent, or Firm* — Finnegan, Henderson, Farabow, Garrett & Dunner, LLP

(57) ABSTRACT

Collecting and distributing information related to recent content publication activity of an instant messaging (IM) user provides other users in a network with timely, relevant information about people known to the user or within the same social network. A user participating in a social network can quickly and efficiently perceive new information related to other users (referred to as co-users) in a social network by reviewing the co-users' recent content publication activity. A user may be made able to do so without requiring the co-user to send a communication directly to the user regarding the new facts or new content, and also without requiring the user to actively browse or request information about the co-user.

33 Claims, 16 Drawing Sheets

U.S. PATENT DOCUMENTS

| | | | |
|---|---|---|---|
| 2003/0182310 | A1 | 9/2003 | Charnock et al. |
| 2004/0024846 | A1 | 2/2004 | Randall et al. |
| 2004/0153456 | A1 | 8/2004 | Charnock et al. |
| 2004/0249811 | A1 | 12/2004 | Shostack et al. |
| 2005/0055416 | A1 | 3/2005 | Heikes et al. |
| 2005/0114527 | A1 | 5/2005 | Hankey et al. |
| 2005/0174975 | A1 | 8/2005 | Mgrdechian et al. |
| 2005/0198299 | A1 | 9/2005 | Beck et al. |
| 2005/0235062 | A1 | 10/2005 | Lunt et al. |
| 2006/0004691 | A1 | 1/2006 | Sifry |
| 2006/0020510 | A1 | 1/2006 | Vest |
| 2007/0156809 | A1 | 7/2007 | Dickinson et al. |
| 2008/0046976 | A1* | 2/2008 | Zuckerberg .................... 726/4 |
| 2008/0091656 | A1 | 4/2008 | Charnock et al. |

OTHER PUBLICATIONS

Leung et al., "Efficient Matching for State-Persistent Publish/Subscribe Systems", Oct. 2003, IBM Canada, pp. 1-15.

Graham et al., "Publish-Subscribe Notification for Web Services", Mar. 5, 2004, Version 1.0, Akamai Technologies et al., pp. 1-19.

Eugster et al., "The Many Faces of Publish/Subscribe", Jun. 2003, ACM Computing Surveys, pp. 114-131.

Small, "Co-Citation in the Scientific Literature", Jul. 1973. Journal of Americal Society of Information Science, pp. 265-269.

Mitchell et al., "The unfolding model of voluntary turnover and job embeddedness: Foundations for a comprehensive theory of attachment", Nov. 20, 2003, Research in Organizational Behavior, vol. 23, pp. 189-246, <Retrieved from ScienceDirect.com Mar. 10, 2009>.

Thefacebook, Mark Suckerberg production 2005.

Office Action issued in U.S. Appl. No. 11/621,924, dated Mar. 20, 2009 (21 pages).

Office Action issued in U.S. Appl. No. 11/621,929, dated Apr. 21, 2009 (18 pages).

Office Action issued in U.S. Appl. No. 11/621,924, dated Nov. 12, 2009 (29 pages).

RSS 0.91 Spec, revision 3, Jul. 10, 1999, 45 pages http://web.archive.org/web/20001204093600/http://my.netscape.com/publish/formats/rss-spec-0.91.html.

RDF Site Summary (RSS) 1.0, Oct. 23, 2007, 23 pages, http://web.resource.org/rss/1.0/spec.

RDF Site Summary 1.0 modules, Oct. 23, 2007, 5 pages, http://web.resource.org/rss/1.0/modules.

RSS 2.0 Specification (RSS 2.0 at Harvard Law), Jul. 15, 2003, 12 pages, http://cyber.law.harvard.edu/rss/rss.html.

My Netscape Network Help, Oct. 23, 2007, 6 pages, http://web.archive.org/web/20001208063100/http://my.netscape.com/publish/help/quickstart.html.

* cited by examiner

FIG. 3

CONFIGURE PRIVACY SETTINGS

☐ BLOCK ALL NOTIFICATIONS (OVERRIDE PRIVACY SETTINGS) — 1040

ALLOW OTHER USERS TO BE NOTIFIED WHEN YOU ADD OR UPDATE: — 1010

- ☑ AWAY MESSAGES
- ☑ USER PROFILE
- ☑ JOURNAL ENTRIES
- ☐ MESSAGE BOARD POSTS
- ☑ PHOTOS
- ☐ FAVORITES LIST
- ☐ RSS FEED SUBSCRIPTIONS
- ☐ THIRD PARTY SERVICE ACCOUNTS (E.G., MYSPACE)

DO NOT NOTIFY OTHER USERS IF CONTENT: — 1020

- ☐ RELATES TO FAMILY
- ☑ RELATES TO WORK
- ☑ INCLUDES ADULT TOPICS
- ☐ INCLUDES STRONG LANGUAGE
- ☐ MENTIONS FEED SUBSCRIPTIONS
- ☑ MENTIONS THESE PARTICULAR PEOPLE

CHATTINGCHUCK
  MOM
  STUPIDBOSS
  *CLICK HERE TO ADD MORE*

- ☐ INCLUDES THESE WORDS [TYPE WORDS HERE]

WHO SHOULD BE NOTIFIED OF ADDITIONS/UPDATES:

- ☐ ALL CO-USERS — 1030
- ☑ PEOPLE IN CONTACT LIST
- ☐ ALL AIM USERS
- ☐ ALL AOL MEMBERS
- ☐ NO CO-USERS SHOULD BE NOTIFIED
- ☑ CO-USERS IN THESE GROUPS
  - ◉ FRIENDS
  - ○ FAMILY
  - ◉ COWORKERS
  - ○ CHESS TEAMMATES
  - ◉ LAW SCHOOL PALS
- ☑ THESE PEOPLE

GOSSIPYGAIL
  YERTLETOO
  "BILL KLAVON"
  JASON 1DC
  DPARHAM02
  MOM
  STUPIDBOSS
  SISTER122380
  *CLICK HERE ADD MORE*

INDICATING RECENT CONTENT PUBLICATION ACTIVITY BY A USER

CROSS REFERENCE TO RELATED APPLICATIONS

This application is a continuation of U.S. patent application Ser. No. 11/621,929, filed Jan. 10, 2007, titled "Indicating Recent Content Publication Activity by a User," now U.S. Pat. No. 7,783,592, which claims priority to U.S. Provisional Application No. 60/757,397, filed Jan. 10, 2006, titled "Syndicating Information Related to Instant Messaging User Activity," both of which are incorporated herein by reference in their entirety.

TECHNICAL FIELD

This application relates to indicating recent content publication activity by a user.

BACKGROUND

An instant messaging (IM) user is provided with status information about co-users whose screen names are included in a co-user list owned by the user. The status information indicates whether a particular co-user is online, offline, available, or not available (e.g., away). If the co-user is not available, the status information can include an away message.

SUMMARY

In a first general aspect, recent content publication activity by a publishing online identity is indicated. A remote server is configured to determine that the publishing online identity has engaged in recent content publication activity. The remote server is configured to determine a type of recent content publication activity associated with the recent content publication activity. The remote server is configured to provide an indication that the publishing online identity has engaged in recent content publication activity. The indication includes an identifier corresponding to the publishing online identity and information that enables display of the type of recent content publication activity engaged in by the publishing online identity. A client is configured to receive the indication that the publishing online identity has engaged in recent content publication activity. The client is configured to access co-user online identifiers that are associated with a second online identity and that are included by the second online identity in a co-user list that reveals to the second online identity an online availability of co-user online identities corresponding to the co-user online identifiers within the co-user list. The client is configured to determine that the identifier corresponding to the publishing online identity is included among the co-user online identifiers included in the co-user list. The client is configured to access publication preference information associated with the publishing online identity, and based on the publication preference information, determine whether the publishing online identity desires to make the recent content publication activity accessible to at least one other online identity. The client is configured to access co-user list preference information associated with the second online identity, and, based on the preference information, determine whether the second online identity desires to receive an indication of recent content publication activity. The client is configured to render a representation of the type in association with the identifier in the co-user list to indicate to the second online identity that the publishing online identity has engaged in the recent content publication activity.

In a second general aspect, recent content publication activity by a publishing online identity is indicated. An indication that the publishing online identity has engaged in recent content publication activity is received at a client. An identifier is provided to identify the publishing online identity. Information that enables the client to display a representation of a type associated with the recent content publication activity is received. The representation of the type is displayed in association with the identifier to indicate that the publishing online identity has engaged in the recent content publication activity.

With respect to at least the second general aspect, implementations may include one or more of the following. For example, receiving information that enables the client to display a representation of a type associated with the recent content publication activity may include receiving the representation of the type associated with the recent content publication activity. Receiving information that enables the client to display a representation of a type associated with the recent content publication activity may include receiving information that indicates the type associated with the recent content publication activity, and selecting a representation of the type for display. Receiving information that enables the client to display a representation of a type associated with the recent content publication activity may include receiving information that describes the recent content publication activity, determining a type associated with the recent content publication activity based on the received information, and selecting a representation of the type for display.

Co-user online identifiers that are associated with a second online identity and that are included by the second online identity in a co-user list that reveals to the second online identity an online availability of co-user online identities corresponding to the co-user online identifiers within the co-user list may be accessed. In response to determining that the publishing online identity is included among the co-user identifiers, publication preference information associated with the publishing online identity may be accessed. Based on the publication preference information, and in response to determining whether the publishing online identity desires to share the recent content publication activity, co-user list preference information associated with the second online identity may be accessed. Based on the preference information, and in response to determining whether the second online identity desires to receive an indication of recent content publication activity, the representation of the type may be rendered in association with the identifier based on the determinations.

Determining that the publishing online identity desires to share the recent content publication activity may include determining that the publication preference information includes an indication that the publishing online identity desires to share recent content publication activity with the second online identity. Determining that the publication preference information includes an indication that the publishing online identity desires to share recent content publication activity with the second online identity may include determining that the publication preference information includes an indication that the publishing online identity desires to share recent content publication activity with a particular class of online identities to which the second online identity belongs. The particular class may include online identities other than the second online identity that are identified in a selection by the publishing online identity. The particular class may include particular online identities identified in a selection by the publishing online identity.

Determining that the publishing online identity desires to share the recent content publication activity may include determining that the publication preference information includes an indication that the publishing online identity desires to share recent content publication activity having a type that is the same as the identified type, or based on content associated with the recent content publication activity.

Rendering a representation of the type in association with the identifier may include rendering the representation of the type in association with the identifier in a co-user list. Rendering a representation of the type in association with the identifier may include rendering the representation of the type in a profile associated with the co-user.

Rendering a representation of the type in association with the identifier may include rendering a representation of the type in association with the identifier in a co-user information ticker. Only representations of types of recent content publication activity and associated identifiers may be rendered in the co-user information ticker. Less than a threshold amount of information may be rendered in the co-user information ticker. The threshold amount of information may be related to a number of co-users about which recent content publication activity information is provided, an amount of recent content publication activity information provided for a particular co-user, or a total amount of information related to recent content publication activity rendered during a particular time period.

Receiving an indication that the publishing online identity has engaged in recent content publication activity may include receiving an indication that the publishing online identity engaged in activity directed to an intermediary for access by other online identities.

Receiving an indication that the publishing online identity has engaged in recent content publication activity may include receiving an indication that the publishing online identity has engaged in creation of a digital asset, a communication tool, or a community-related asset. Receiving an indication that the publishing online identity has engaged in recent content publication activity may include receiving an indication that the publishing online identity has engaged in creation of a digital asset that includes an electronic file stored in an electronic data store and associated with the publishing online identity. Receiving an indication that the publishing online identity has engaged in recent content publication activity may include receiving an indication that the publishing online identity has engaged in creation of a communication tool that includes an electronic implement used by the publishing online identity to communicate with other online identities and engage in social networking. Social networking may occur if the publishing online identity communicates with other online identities, views digital assets associated with other online identities, or shares digital assets with other online identities. Receiving an indication that the publishing online identity has engaged in recent content publication activity may include receiving an indication that the publishing online identity has engaged in creation of a community-related asset that includes content shared among the publishing online identity and other online identities.

Receiving an indication that the publishing online identity has engaged in recent content publication activity may include receiving an indication that the publishing online identity has performed an addition, deletion, or change to a digital asset, a communication tool, or a community-related asset. Receiving an indication that the publishing online identity has engaged in recent content publication activity may include receiving an indication that the publishing online identity has engaged in creation of, or an update to, a third party service provider account owned by the publishing online identity.

Determining a type associated with the recent content publication activity may include receiving an indication of a type associated with the recent content publication activity from a remote server. Determining a type associated with the recent content publication activity may include accessing recent content publication activity type information, comparing the recent content publication activity with the accessed information, and based on the comparison, identifying a type associated with the recent content publication activity.

The type associated with the recent content publication activity may include creation of a user profile, an online journal, a blog, a playlist, a photograph album, or an account associated with a third party service provider. The type associated with the recent content publication activity may include an update to a user profile, an online journal entry, a blog entry, a playlist, a photograph album, or an account associated with a third party service provider. Rendering a representation of the type may include rendering an image, an animation, a sound, a pop-up, text, scrolling text, or a scrolling image.

Other online identities may be selectively enabled to view the recent content publication activity by manipulating the representation. Other online identities may be enabled to search for recent content publication activity associated with the publishing online identity by providing a desired type of recent content publication activity, an identifier associated with recent content publication activity, or a keyword associated with the recent content publication activity. Other online identities may be enabled to sort indications of recent content publication activity based on a type of recent content publication activity, an identifier associated with the recent content publication activity, or a keyword associated with the recent content publication activity.

An indication of the recent content publication activity by the publishing online identity may be rendered within a co-user list, a user profile associated with the publishing online identity, a pop-up window that is rendered when the identifier associated with the publishing online identity is selected from within a co-user list, or a co-user information ticker. An indication of the recent content publication activity by the publishing online identity may be rendered in association with indications of recent content publication activity by other publishing online identities.

In a third general aspect, recent content publication activity by a publishing online identity is indicated. In response to determining that the publishing online identity has engaged in recent content publication activity, a type associated with the recent content publication activity is determined. An identifier is provided to identify the publishing online identity. Information is provided to a client that enables the client to display a representation of the type in association with the identifier in order to indicate that the publishing online identity has engaged in the recent content publication activity.

With respect to at least the third general aspect, implementations may include one or more of the following. For example, providing information that enables the client to display a representation of the type in association with the identifier may include providing the representation of the type associated with the recent content publication activity to the client. Providing information that enables the client to display a representation of the type in association with the identifier may include providing information that indicates the type associated with the recent content publication activity, and enabling the client to select a representation of the type for display. Providing information that enables a client to display a representation of the type in association with the identifier may include providing information that describes the recent content publication activity, enabling the client to determine a type associated with the recent content publication activity based on the received information, and enabling the client to select a representation of the type for display.

Determining that the publishing online identity has engaged in recent content publication activity may include receiving an indication that the publishing online identity has engaged in recent content publication activity. Receiving an indication that the publishing online identity has engaged in recent content publication activity may include receiving an indication that the publishing online identity has engaged in recent content publication activity in connection with a third party service account from a third party service provider associated with the account.

Determining that the publishing online identity has engaged in recent content publication activity may include monitoring at least one of digital assets, communication tools, and community-related assets associated with the publishing online identity, and, based on detecting that the publishing online identity has created, or updated, at least one of the monitored digital assets, communication tools, or community-related assets, determining that the publishing online identity has engaged in recent content publication activity.

Determining a type associated with the recent content publication activity may include receiving an indication of a type associated with the recent content publication activity in association with determining that the publishing online identity has engaged in recent content publication activity. Determining a type associated with the recent content publication activity may include accessing recent content publication activity type information, and, based on comparing the recent content publication activity with the accessed information, identifying a type associated with the recent content publication activity.

Determining that the publishing online identity has engaged in recent content publication activity may include determining that the publishing online identity has engaged in activity directed to an intermediary for access by other online identities.

Determining that the publishing online identity has engaged in recent content publication activity may include determining that the publishing online identity has engaged in creation of at least one of a digital asset, a communication tool, and a community-related asset. Determining that the publishing online identity has engaged in recent content publication activity may include determining that the publishing online identity has engaged in creation of a digital asset that includes an electronic file stored in an electronic data store and associated with the publishing online identity. Determining that the publishing online identity has engaged in recent content publication activity may include determining that the publishing online identity has engaged in creation of a communication tool that includes an electronic implement used by the publishing online identity to communicate with other online identities and engage in social networking. Social networking may occur if the publishing online identity communicates with other online identities, views digital assets associated with other online identities, or shares digital assets with other online identities. Determining that the publishing online identity has engaged in recent content publication activity may include determining that the publishing online identity has engaged in creation of a community-related asset that includes content shared among the publishing online identity and other online identities.

Determining that the publishing online identity has engaged in recent content publication activity may include determining that the publishing online identity has engaged in recent content publication activity that includes an addition, deletion, or change to a digital asset, a communication tool, or a community-related asset. Determining that the publishing online identity has engaged in recent content publication activity may include determining that the publishing online identity has engaged in recent content publication activity that includes creation of, or an update to, a third party service provider account owned by the publishing online identity.

Determining a type associated with the recent content publication activity may include determining a classification for the recent content publication activity. Determining a type associated with the recent content publication activity may include determining a characterization for the recent content publication activity.

In a fourth general aspect, recent content publication activity by a publishing online identity is indicated. In response to determining that the publishing online identity has engaged in recent content publication activity, a type of recent content publication activity associated with the recent content publication activity is determined. An indication that the publishing online identity has engaged in recent content publication activity is generated. The indication may include an identifier corresponding to the publishing online identity and information that enables display of the type of recent content publication activity engaged in by the publishing online identity. Co-user online identifiers that are associated with a second online identity and that are included by the second online identity in a co-user list that reveals to the second online identity an online availability of co-user online identities corresponding to the co-user online identifiers within the co-user list are accessed. In response to determining that the identifier corresponding to the publishing online identity is included among the co-user online identifiers included in the co-user list, publication preference information associated with the publishing online identity is accessed. Based on the publication preference information, and in response to determining whether the publishing online identity desires to make the recent content publication activity accessible to at least one other online identity, co-user list preference information associated with the second online identity is accessed. Based on the preference information, and determining whether the second online identity desires to receive an indication of recent content publication activity, a representation of the type is rendered in association with the identifier in the co-user list to indicate to the second online identity that the publishing online identity has engaged in the recent content publication activity.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 3 illustrates an example of a user profile that provides information associated with a co-user.

FIG. 10 illustrates an example of a GUI structured and arranged to enable a user to specify privacy settings for recent content publication activity information that may be provided to one or more co-users.

DETAILED DESCRIPTION

Figure 1:
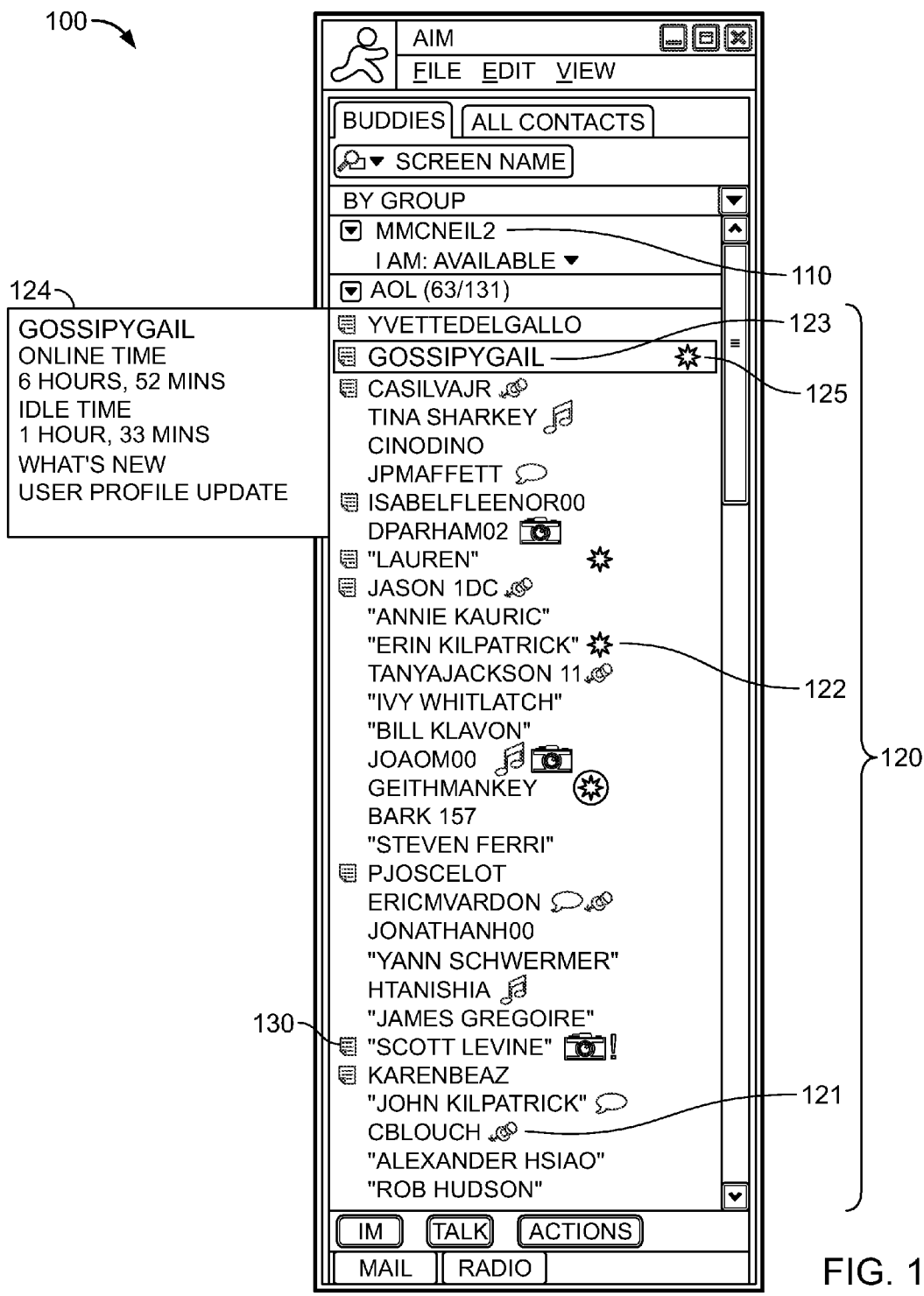
FIG. 1 illustrates an example of a co-user list configured to provide recent content publication activity information for one or more co-users.

Collecting and distributing information related to recent content publication activity of an instant messaging (IM) user provides other users in a network with timely, relevant information about people known to the user or within the same social network. A user participating in a social network can quickly and efficiently perceive new information related to other users (referred to as co-users) in a social network by reviewing the co-users' recent content publication activity. A user can, for example, learn new facts about a co-user and also become aware of new content by reviewing information associated with a co-user's recent content publication activity. A user may be made able to do so without requiring the co-user to send a communication directly to the user regarding the new facts or new content, and also without requiring the user to actively browse or request information about the co-user.

A host is configured to collect and syndicate (or otherwise publish) information relating to the recent content publication activity of a co-user. If a co-user performs an activity, information about the activity is collected and distributed (or otherwise made perceivable) in a format capable of being perceived by other users (e.g., those in a common social network). The information collected may relate to a co-user's recent content publication activity in the co-user's community, communication with other users, or digital assets, and may include, for example, recent content publication activity with respect to a journal entry, a user profile, a music playlist, an away message, a feed subscription, a picture or photograph, or a blog post. For example, if a co-user adds a photograph to a photograph album within the co-user's digital assets or makes a new blog post, information related to the new assets is collected. The collected information then is provided in a feed (e.g., an RSS or other protocol/format feed) and made available to other users in the social network.

The collected information may be provided in a co-user feed area, in Portal xpRSS, in user profiles (e.g., an AOL Member Directory profile, an AOL Instant Message (AIM) Space Page, an AIM Page Personal Profile, a Buddy Info Personal Profile, an AIM Buddy Info window), in an away message window, or as an icon associated with a screen name displayed in a list of co-users. For example, if a co-user updates the co-user's assets as discussed above, an icon indicating that the update took place may be displayed proximate to a screen name associated with the co-user in a list of co-users (e.g., an AOL or AIM Buddy List). By this operation, other users in a social network may be notified of a co-user's recent content publication activity without the co-user having to independently contact all of the users in the social network.

In some implementations, the notification may provide users with information related only to that portion of the co-user's assets that have changed or were created due to the recent content publication activity. For example, if a co-user has added a new photograph to a photograph album, other users may receive a notification directly related to the single new photograph (e.g., a thumbnail image of the new photograph or a link that directly refers to the new photograph). Additionally, or alternatively, the notification may provide users with information related to the asset that has been changed or updated. In the new photograph example, other users may receive a notification including a link to a welcome screen associated with the co-user's photograph albums or thumbnail images of the top 10 photographs in the co-user's albums, which may or may not include the newly added photograph.

Techniques are provided for indicating recent content publication activity by a co-user. An indication that the user has engaged in recent content publication activity is received. A screen name (or an identifier) is provided to identify the user. A type associated with the recent content publication activity is identified and a representation of the type is rendered in association with the screen name to indicate that the user has engaged in the recent content publication activity.

Recent content publication activity is activity directed by a user to an intermediary for access by co-users. For example, a user may create a new online photograph album, or add a photograph to an existing online photograph album so that others may access and view the newly added album or photograph. To do so, the user accesses an electronic data store (e.g., a remote server) in which the online photograph album is, or will be, stored. As such, the electronic data store is an intermediary through which the user can perform particular activities (e.g., add a new photograph) and by which co-users can access information associated with the particular activities (e.g., view a newly added photograph). Thus, co-users can receive information associated with recent content publication activity of the user without the user directing the recent content publication activity (or an indication thereof) to one or more particular co-users.

Other examples of recent content publication activity include (1) emailing a weblog post to a weblog service to be included in the user's weblog, (2) creation of a third party service provider account by the user where the creation of the account creates a profile, web page, or other central location where the user may interact with the features of the account, and (3) indicating that the user viewed a feed or a web page by publishing an identifier of the feed or a uniform resource locator (URL) of the web page in a user profile associated with the user. As described above, these activities by the user are not directed to one or more particular co-users (in contrast to an email or an instant message, which is always directed to one or more particular co-users), but rather are directed by the user to an intermediary. Co-users then may access the content by accessing the intermediary. In some implementations, the intermediary may perform screening operations in order to limit access by co-users to the published content based on preferences of the publishing user or the co-users.

Co-user list 100 of FIG. 1 is configured to provide recent content publication activity information for one or more co-users. Co-user list 100 belongs to a user who is represented by a screen name "MMcNeil2" 110. Co-user list 100 includes a listing of individual co-user names 120 for co-users who are known to user MMcNeil2 and are currently logged in to the social network (e.g., are "online"). Co-users are identified in co-user list 100 by an identifier (e.g., a screen name) associated with the user, such as, for example, the user "cblouch" or by a name selected by the owner of the co-user list 100, such as, for example, user "Lauren." Owner-selected names for users may be presented in quotation marks to indicate that these names are not screen names chosen by the particular co-user to which the name refers, but rather indicators selected by the owner of the co-user list 100.

In association with the display of the co-user names 120 in the co-user list 100, recent content publication activity information also is displayed. For example, a recent content publication activity icon 121 is displayed next to the name of co-user cblouch in the co-user list 100. A recent content publication activity icon indicates a type of recent content publication activity in which a particular co-user has engaged and which is available for review by the owner of a co-user list. For example, a pushpin recent content publication activity icon 121 is displayed next to the co-user name cblouch. A pushpin recent content publication activity icon indicates that the co-user has posted a new message to an online message board. Other examples of recent content publication activity icons, and types of recent content publication activity referred to thereby, are as follows in Table 1. This list is not exhaustive and other recent content publication activity icons may be used to reference the listed recent content publication activity types or additional recent content publication activity types.

TABLE 1

| Recent Content Publication Activity Icon | Recent Content Publication Activity Type |
| --- | --- |
| star | user profile update |
| | creation of a new user profile |
| speech bubble | new journal/blog entry |
| | creation of a new journal or blog |
| music note | new song added to a playlist |
| | new playlist created |
| camera | new photograph added to album |
| | new photograph album created |
| exclamation point next to any icon | indicates highly important or |

TABLE 1-continued

| Recent Content Publication Activity Icon | Recent Content Publication Activity Type |
| --- | --- |
| any icon | substantial recent content publication activity |
| circle around any icon | indicates moderately important or non-substantial recent content publication activity |

In some implementations, recent content publication activity icons may be created or customized by the owner of the co-user list 100. The owner of the co-user list 100 may be enabled to select an icon from among a collection of existing icons to be displayed in association with a particular screen name when the co-user associated with the particular screen name has engaged in recent content publication activity of a particular type. For example, rather than using the music note recent content publication activity icon to indicate a new song being added to a playlist, the owner of co-user list 100 may select a Madonna recent content publication activity icon since Madonna is the owner's favorite singer. In some implementations, the owner of the co-user list 100 also may be enabled to customize existing recent content publication activity icons for a particular purpose. For example, if a particular co-user has posted a new message to an online message board, and the new message is related to politics, the owner of the co-user list 100 may cause a red, white, and blue pushpin icon to be provided in association with the co-user's screen name in the co-user list 100, rather than the generic, single-colored pushpin that is generally associated with a new online message board posting.

In some implementations, the owner of the co-user list 100 may be enabled to create a new recent content publication activity icon and indicate a type of recent content publication activity to be represented by the icon. For example, the owner of the co-user list 100 may generate a new icon based on an image of the owner's best friend. Whenever recent content publication activity has been performed by the owner's best friend, the new icon may be provided in the co-user list 100 in association with a screen name that identifies the owner's best friend. In another example, the owner of the co-user list 100 may generate a new icon based on an image of the owner's favorite car and may indicate that any recent content publication activity associated with cars or transportation should be identified using the new icon.

A user may adjust the user's social network by adding or deleting co-users from the co-user list 100. If the user adds a new co-user to the co-user list 100, the user may be provided with recent content publication activity information for the new co-user if, and when, the co-user engages in recent content publication activity, as discussed above. Additionally, at the time that the new co-user is added to the co-user list 100, information associated with all current and past content publication activity performed by the new co-user may be provided to the user. As such, recent content publication activity icons may be displayed next to the name of the new co-user in the co-user list 100 for each type of content publication activity currently associated with the new co-user. In some implementations, the content publication activity icons may be displayed for a limited amount of time after the new co-user is added to co-user list 100. Additionally, or alternatively, information associated with the current and past content publication activity of the new co-user may be provided to the user in a web display (e.g., as shown in one of FIGS. 2-5), an e-mail or instant message directed to the user, or in some other manner.

For example, user MMcNeil2 may add co-user NewFriend to the co-user list 100. Co-user NewFriend may currently be engaging in (or may have previously engaged in) content publication activity associated with updating a user profile, adding new entries to a blog, and adding new photographs to a photograph album. As such, recent content publication activity icons related to each of the three recent content publication activity types (e.g., a star icon for the content publication activity associated with the user profile, a speech bubble icon for the content publication activity associated with the blog entries, and a camera icon for the content publication activity associated with the photograph icon) may be displayed in association with the co-user name NewFriend in the co-user list 100. Thus, upon adding co-user NewFriend to co-user list 100, the user MMcNeil2 may be notified that co-user NewFriend has previously engaged in, or is currently engaging in, content publication activity associated with a user profile, a blog, and a photograph album. As the co-user NewFriend engages in future content publication activity, recent content publication activity icons may be displayed in the co-user list 100 in association with the co-user name NewFriend, as discussed above.

In some implementations, the owner of the co-user list 100 may select a recent content publication activity icon by, for example, hovering a pointer device (e.g., a mouse) over the icon. Doing so enables the user to receive detailed information about the recent content publication activity icon, such as, for example, an indication of the recent content publication activity type represented by the icon, an indication of content associated with the recent content publication activity being referred to by the icon, or a link, or other mechanism, by which the user may access the content associated with the recent content publication activity. For example, user MMcNeil2 may hover a mouse pointer over the recent content publication activity icon 122 displayed in association with co-user name Erin Kilpatrick. In response, a tooltip or other indicator (not shown) may be provided to indicate that the star recent content publication activity icon 122 represents an update to co-user Erin Kilpatrick's user profile. The star recent content publication activity icon 122 also may provide a link to content associated with the recent content publication activity (e.g., a link to the co-user Erin Kilpatrick's user profile or a link directly to the new information that has been added to the user profile). In some implementations, a recent content publication activity icon may dim or disappear after a user views content associated with the recent content publication activity or otherwise indicates that the information has been considered.

Moreover, a user may contact (e.g., by IM, email or even telephone) a co-user if the user realizes that the user and the co-user share a similar interest based on the information obtained by the user relating to the co-user's recent content publication activity. In this way, display of a recent content publication activity icon fosters an increase in social networking and communication between users at times when the users may not have otherwise communicated. An increase in social networking may be detected based on, for example, a total number of communications (e.g., instant messages or emails) that are sent by users during a particular time period and whether the total number exceeds a particular threshold, a number of communications sent from one user to another during a particular time period and whether the number exceeds a particular threshold, an increase in the number of total communications sent by users over two time periods (e.g., comparison between a first one-day total and a second, subsequent one-day total), an increase in the number of communications sent from one user to another over two time periods, or in some other fashion involving a number of communications. An increase in social networking also may be detected based on, for example, an increase in a number of co-users included in a co-user list owned by a particular user, or an increase in a number of co-users included in co-user lists owned by all, or a subset of all, users within a particular social network. An increase in social networking may further be detected based on, for example, an increase in a number of access operations (e.g., views) for content associated with recent content publication activity of all or a subset of users.

Additionally, or alternatively, the owner of co-user list 100 may select (e.g., by clicking on, hovering a pointer device over, or otherwise selecting) a co-user name in order to receive information related to the co-user. For example, user MMcNeil2 has selected co-user name GossipyGail 123. In response, a tooltip (or pop-up notification) 124 is presented to user MMcNeil2. The tooltip 124 displays information about co-user GossipyGail including how long the co-user has been online (e.g., 6 hours, 52 mins), how long the co-user has gone without engaging in an instant messaging communications session, which is referred to as being idle (e.g., 1 hour, 33 mins), and recent content publication activity information, referred to as "What's New," about the co-user (e.g., user profile update). The recent content publication activity information provided in tooltip 124 is the same as that indicated by the star recent content publication activity icon 125 displayed in association with co-user name GossipyGail in the co-user list 100.

Another form of recent content publication activity information relates to an availability status (e.g., online, offline, available, or away) indicator. For example, an away icon 130 may be displayed to indicate that co-user Scott Levine is not currently available to engage in an instant messaging communications session and has provided a message (e.g., an away message) explaining the co-user's absence or providing some other information to other users while the co-user is away. In another example, a co-user name may be dimmed or otherwise altered in display (not shown) to indicate that the co-user has been idle or away for more than a predetermined period of time, which may be set by default, by the co-user or by the owner of the co-user list 100.

Other types of recent content publication activity include, but are not limited to (1) creation of a third party service provider account (e.g., creation of a MySpace account, a Friendster account, a Facebook account, a Flickr account, or an Ebay account), (2) updating information associated with a third party service provider account (e.g., adding photographs to a MySpace or Flickr account or bidding on an item through Ebay), (3) updating particular modules of a user profile (e.g., a favorite books module, a links module, or a wishlist module), (4) adding a calendar entry (e.g., adding an appointment to a calendar), (5) changing an online radio configuration or preferences (e.g., AOL Radio), (6) changing expressions (e.g., changing wallpaper, avatar, emoticon styles, or associated music), (7) creating or changing subscriptions to a third party information provider (e.g., renewing a subscription to the Wall Street Journal RSS feed or adding a city to a weather alert service), (8) updating of current capability status (e.g., indicating the co-user is currently able to participate in an online talk session or file transfer or indicating the co-user is currently receiving email or instant messages on a mobile device), and (9) reconfiguring a co-user list (e.g., adding or removing co-users from a co-user list).

Recent content publication activity generally falls within one or more of three categories: (1) community, (2) communication, and (3) digital assets. Recent content publication activity may be community-related if the recent content publication activity affects a co-user's social network. For example, updating a user profile to indicate a new favorite band may increase the co-user's interaction with the co-user's social network by enabling other fans of the band to contact the co-user to discuss music. The other fans may do so by sending the co-user an instant message, an email, a text (e.g., SRS) message, or by requesting to speak with the co-user by, for example, requesting a talk session (e.g., via AIM Talk) or placing a telephone call to a phone number listed in a user profile associated with the co-user.

In another example, adding a co-user to a co-user list owned by a user increases the number of people in the user's social network by the one co-user added to the co-user list (or the number of co-users known to that co-user). Recent content publication activity may be communication-related (e.g., the recent content publication activity is associated with a communication tool) if the recent content publication activity communicates new or updated information to other co-users. For example, a user may create a new journal or blog entry announcing the birth of the user's child, to which other co-users known to the user, or in the general public, can comment, thus increasing communication between the user and others in the user's social network. Recent content publication activity may be related to a user's digital assets if the activity affects one or more digital assets. For example, a user may add a photograph to an existing photograph album, add a song to a playlist, or add a poem to an online collection of writing.

Figure 2:
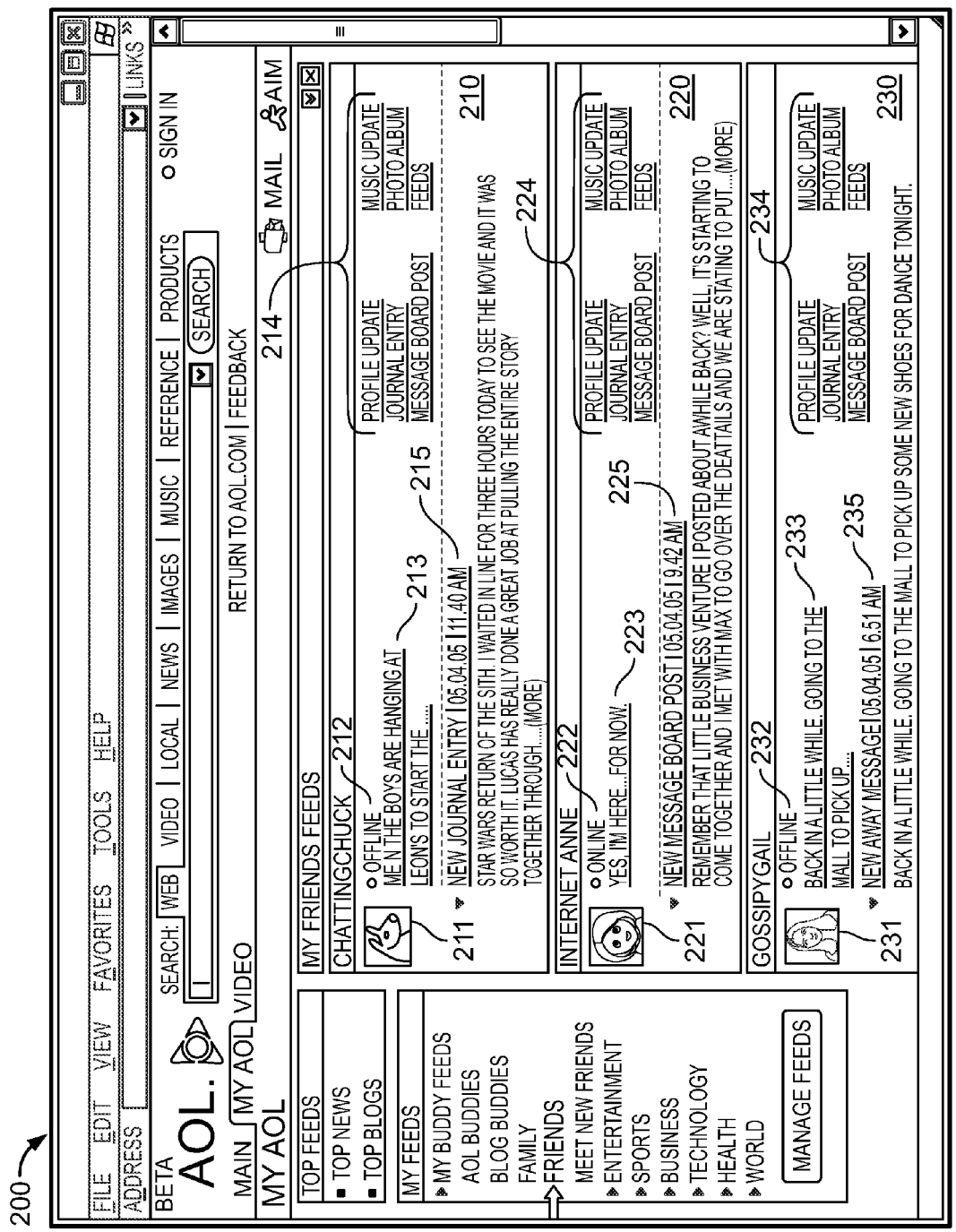
FIG. 2 illustrates an example of a graphical user interface (GUI) configured to provide a user with recent content publication activity information for co-users known to the user.

GUI 200 of FIG. 2 is configured to provide a user with recent content publication activity information for co-users known to the user. More particularly, GUI 200 provides a user with feeds that include information associated with co-users known to the user.

In general, a feed, or a web feed, is a data format used for serving users with frequently-updated content. A user may indicate that the user wishes to receive the information provided by the feed by subscribing to the feed. The user then may be presented with new content as it is available. If the user no longer wishes to receive the information being provided by the feed, the user may simply unsubscribe from the feed. Feeds may be provided in a variety of formats including, for example, RSS (which stands for Really Simple Syndication or Rich Site Summary), Torrent/RSS, or Atom.

GUI 200 provides a feed of information for three co-users: ChattingChuck 210, InternetAnne 220, and GossipyGail 230. For each co-user, an image (e.g., an avatar or icon) 211, 221, and 231, a status indication (e.g., offline, online, away, or available) 212, 222, and 232, and a message (e.g., an away or status message) 213, 223, and 233 is provided. If one of these elements, such as, for example, an image, is not available for a particular user, the feed may be provided without such element.

For each of the three co-uses, a list of recent content publication activity types 214, 224, and 234, is also provided. In some implementations, the recent content publication activity type lists may be a list of information subscribed to by the user for each co-user. For example, a user has subscribed to profile updates, journal entry updates, message board posts, music updates, photograph albums, and feeds received by the co-user, for co-user ChattingChuck 210, as shown at 214. In other words, the user wishes to receive recent content publication activity information for these types of recent content publication activity of co-user ChattingChuck 210. In addition to subscribing to particular types of recent content publication activity for particular co-users, users may search feeds and choose to only receive or highlight new feed activity that meets a certain criteria, thereby enabling users to filter feeds and quickly learn of information that the user finds particularly interesting. Because recent content publication activity information is provided to a user via a feed, users in a social network may only elect to receive information relating to a co-user's recent content publication activity that the user has not previously received.

Additionally, or alternatively, users may be able to set permissions regarding what activities are published and to which other co-users the activities are published. As such, the recent content publication activity type lists 214, 224, and 234 may include recent content publication activity types that the co-user has granted permission for other users to receive. For example, InternetAnne 220 may have granted permission for other users to view recent content publication activity with respect to those types listed in recent content publication activity type list 224.

In some implementations, recent content publication activity information may be translated into syndication. For example, the information may not include the actual content associated with all of the recent content publication activity of a particular co-user, but instead may simply indicate an amount of recent content publication activity (e.g., a number of content items that have been affected by recent content publication activity or an indication that the particular co-user has engaged in a large, or small, amount of recent content publication activity).

Content associated with a most recent content publication activity 215, 225, and 235 also is provided for each of the three co-users. Co-user ChattingChuck 210 most recently (at 11:40 AM on May 4, 2005) added a new journal entry that includes the heading "Star Wars Return of the Sith." Co-user InternetAnne 220 most recently (at 9:P42 AM on May 4, 2005) created a new message board post that includes the question "Remember that little business venture I posted about awhile back?" Co-user GossipyGail 230 most recently (at 6:51 AM on May 4, 2005) created and posted a new away message that begins with the message "back in a little while . . ."

In some implementations, the collected recent content publication activity information for one or more co-users may be provided to third party feed readers to reach a greater number of users or reach entities interested in co-user interests, such as, for example, merchandise retailers or companies that provide targeted advertising. Privacy concerns may be addressed by requiring a co-user's authorization before recent content publication activity information associated with the co-user is provided to the third party feed readers or to third party feed readers that are subscribed to by commercial entities.

Figure 3:
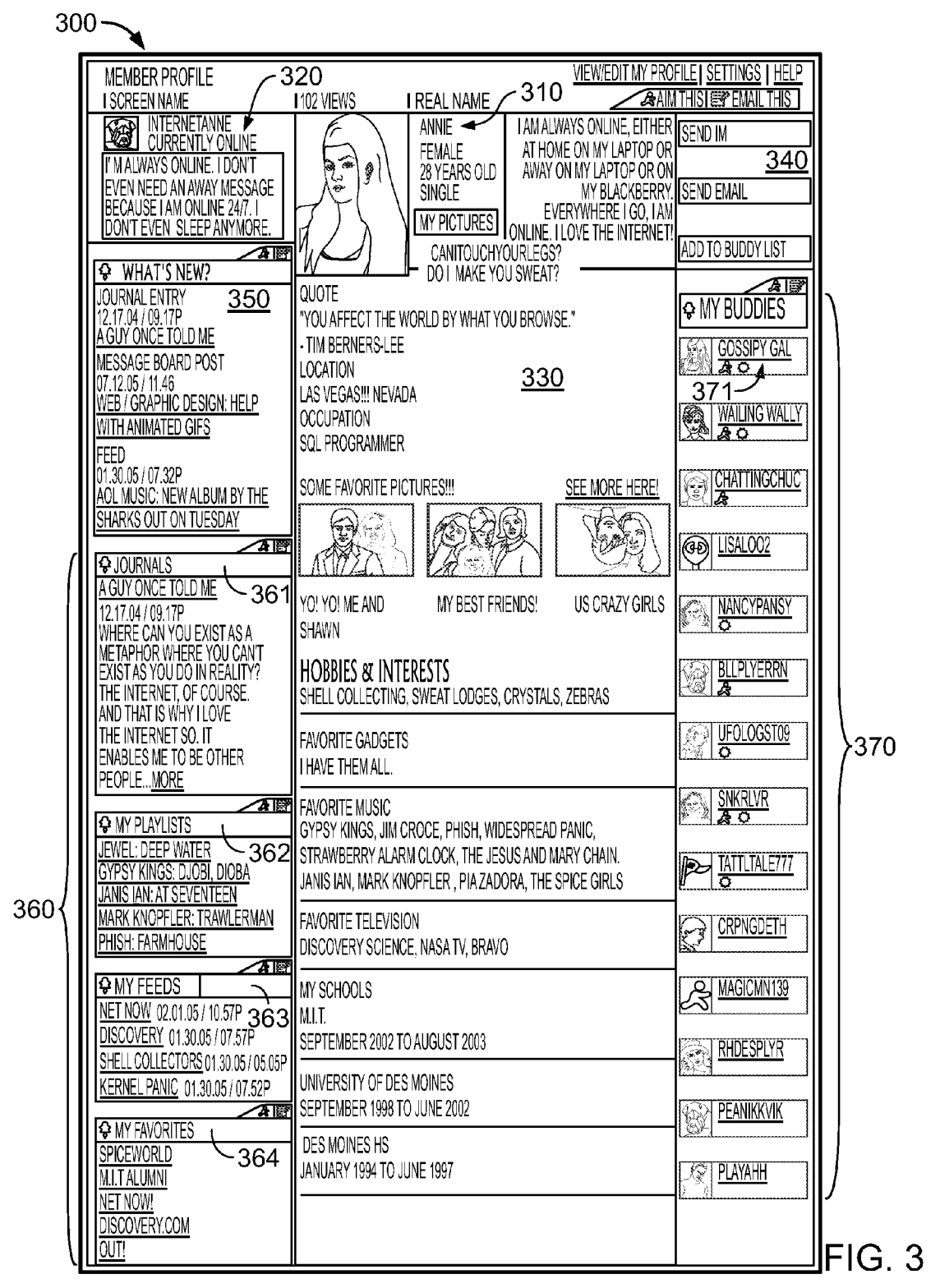

User profile 300 of FIG. 3 provides information associated with a co-user. More particularly, user profile 300 shows information associated with co-user Annie.

User profile 300 includes personal information 310, which indicates that co-user Annie is female, 28 years old, and single. User profile 300 also includes status (e.g., currently online) and away message (e.g., "I'm always online . . .") 320 information for co-user Annie. Static information 330 provided by the co-user Annie includes a quote, location, occupation, favorite pictures, and hobbies and interests. Other users can contact co-user Annie by sending an IM, sending email, or adding Annie to a co-user list, as shown at 340.

Recent content publication activity information 350 associated with co-user Annie is also included in user profile 300. For example, co-user Annie has recently added a new journal entry, added a message board post, and received a message from a feed to which the co-user Annie is subscribed. User profile 300 also includes recent content publication activity information 360 for co-user Annie for particular types of content, such as, for example, journal recent content publication activity information 361 (e.g., shows at least a portion of one or more most recent journal entries), playlist recent content publication activity information 362 (e.g., shows at least a portion of a current playlist or recent changes to a playlist), feed recent content publication activity information 363 (e.g., shows at least a portion of information received by the co-user from feeds to which the co-user is subscribed and shows changes in the co-user's feed subscriptions), and favorites/links recent content publication activity information 364 (e.g., shows at least a portion of changes in the co-user's favorite web pages).

User profile 300 also includes a list of co-users 370 known to the co-user Annie. The list of co-users 370 includes co-user names and recent content publication activity icons, as described above with respect to co-user list 100 of FIG. 1. For example, the list of co-users 370 includes co-user GossipyGail 371. Displayed in association with co-user name GossipyGail is a recent content publication activity icon that indicates an update to the co-user GossipyGail's user profile, and an indication that co-user GossipyGail is available (e.g., the small icon of a buddy).

Figure 4:
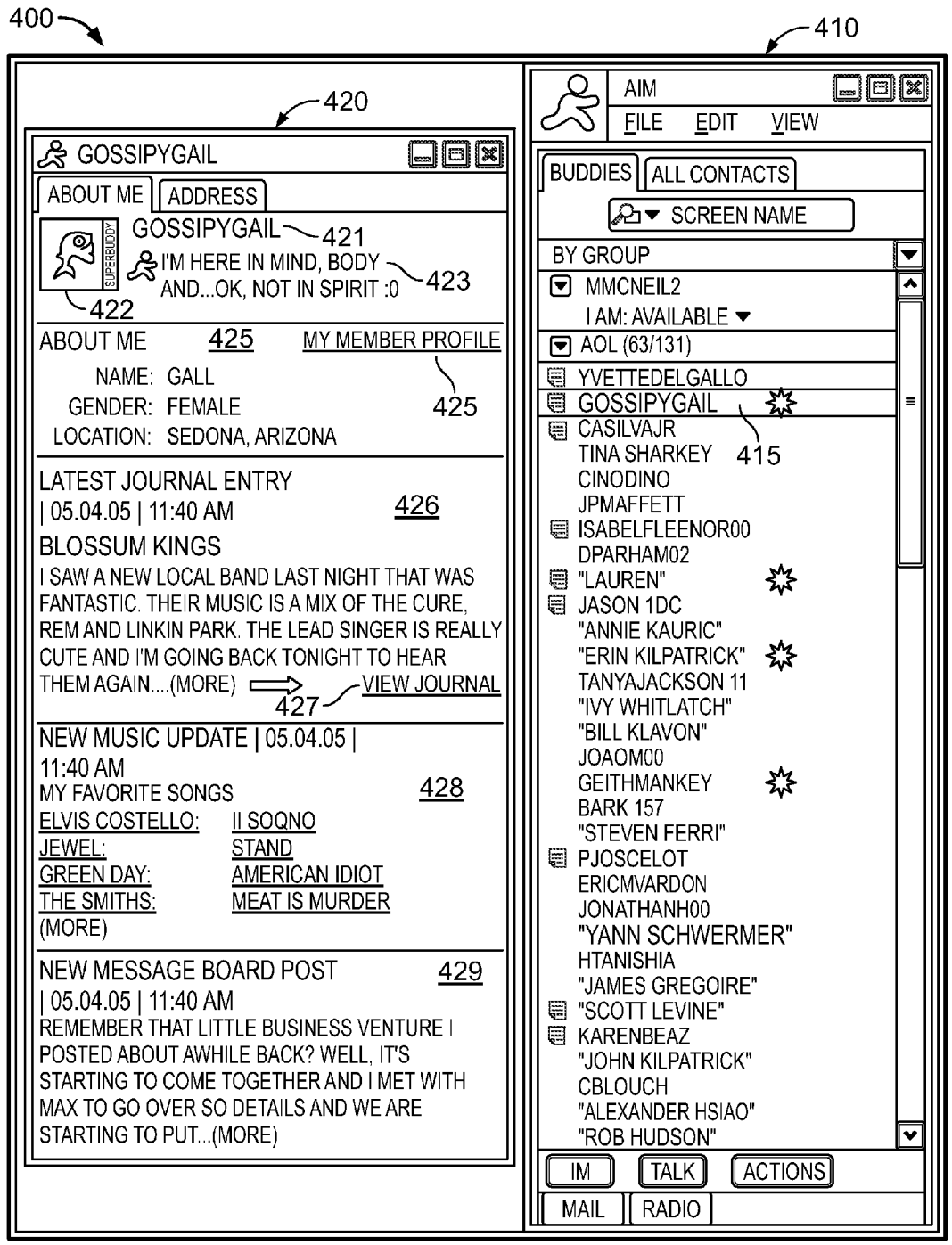
FIG. 4 illustrates an example of a GUI that includes a co-user list and a co-user recent content publication activity profile.

GUI 400 of FIG. 4 includes a co-user list 410 and a co-user recent content publication activity profile 420. A user may select a particular co-user 415 from within the co-user list 410, as described above with respect to co-user list 100 of FIG. 1. Upon selection of co-user 415 (e.g., co-user GossipyGail), the user may be presented with a co-user recent content publication activity profile 420 for the selected co-user 415.

The co-user recent content publication activity profile 420 includes information related to the co-user 415, such as co-user name GossipyGail 421, an image 422 associated with the co-user, and an away message 423. The co-user recent content publication activity profile 420 also includes static "about-me" information 424, which lists the co-user's name as Gail, gender as female, and location as Sedona, Ariz. A link 425 to a user profile associated with the co-user GossipyGail is also provided.

Also included in the co-user recent content publication activity profile 420 is recent content publication activity information. The recent content publication activity information includes a latest journal entry 426 entitled "Blossum Kings," including a link 427 to view the co-user's journal, a new music update 428 listing the co-user's favorite songs, and a new message board post 429 regarding the co-user's business venture.

Figure 5:
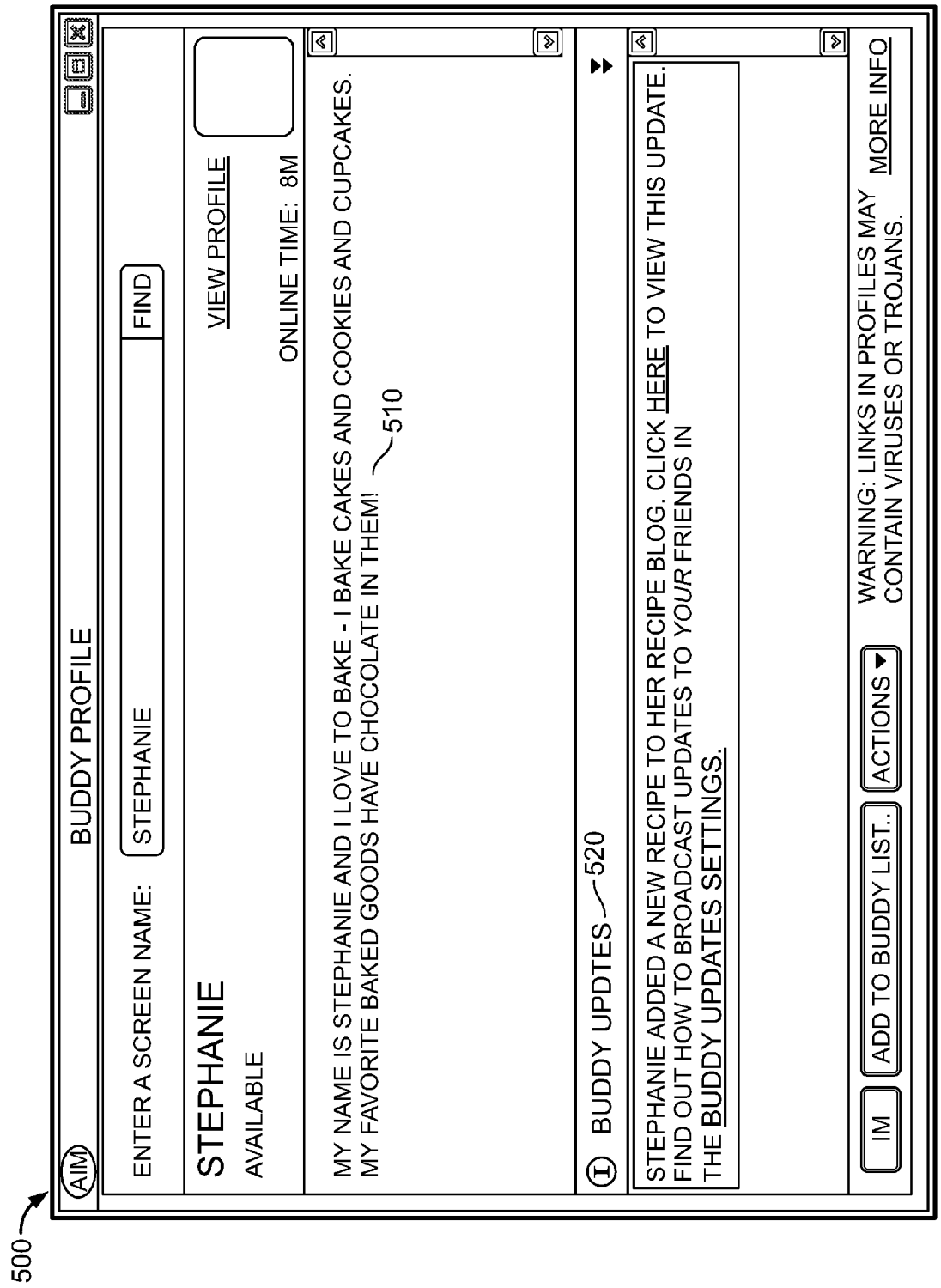
FIG. 5 illustrates an example of a profile for a co-user Stephanie.

Co-user profile 500 of FIG. 5 shows a profile for co-user Stephanie. Co-user profile 500 is another example of a window that may be provided in response to selection of a co-user from within a co-user list. Co-user profile 500 includes a message 510 from co-user Stephanie "My name is Stephanie and I love to bake . . . " and a co-user (or buddy) update 520 that indicates that co-user Stephanie has added a new recipe to her recipe blog and includes a link to view the new recipe.

Figure 6:
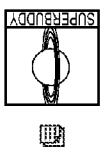
FIG. 6 illustrates an example of a co-user information window configured to show status and recent content publication activity information for a group of co-users.

Co-user information window 600 of FIG. 6 is configured to show status and recent content publication activity information for a group of co-users. More particularly, co-user information window 600 includes status and recent content publication activity information for co-user Yvettedelgatto 610, co-user GossipyGail 620, co-user CASilvaJr 630, and co-user IsabelFleenor00 640. For each of the co-users 610-640, status information 611, 621, 631, and 641 (e.g., co-user Yvettedelgatto has been away since 2:25 pm today), an away message 612, 622, 632, and 642 (e.g., away message of "I'm away" for co-user GossipyGail), and recent content publication activity information "What's New" 613, 623, 633, and 643 (e.g., co-user CASilvaJr has added a new message board post, while co-user IsabelFleenor00 has no new activity) is displayed.

Figure 7:
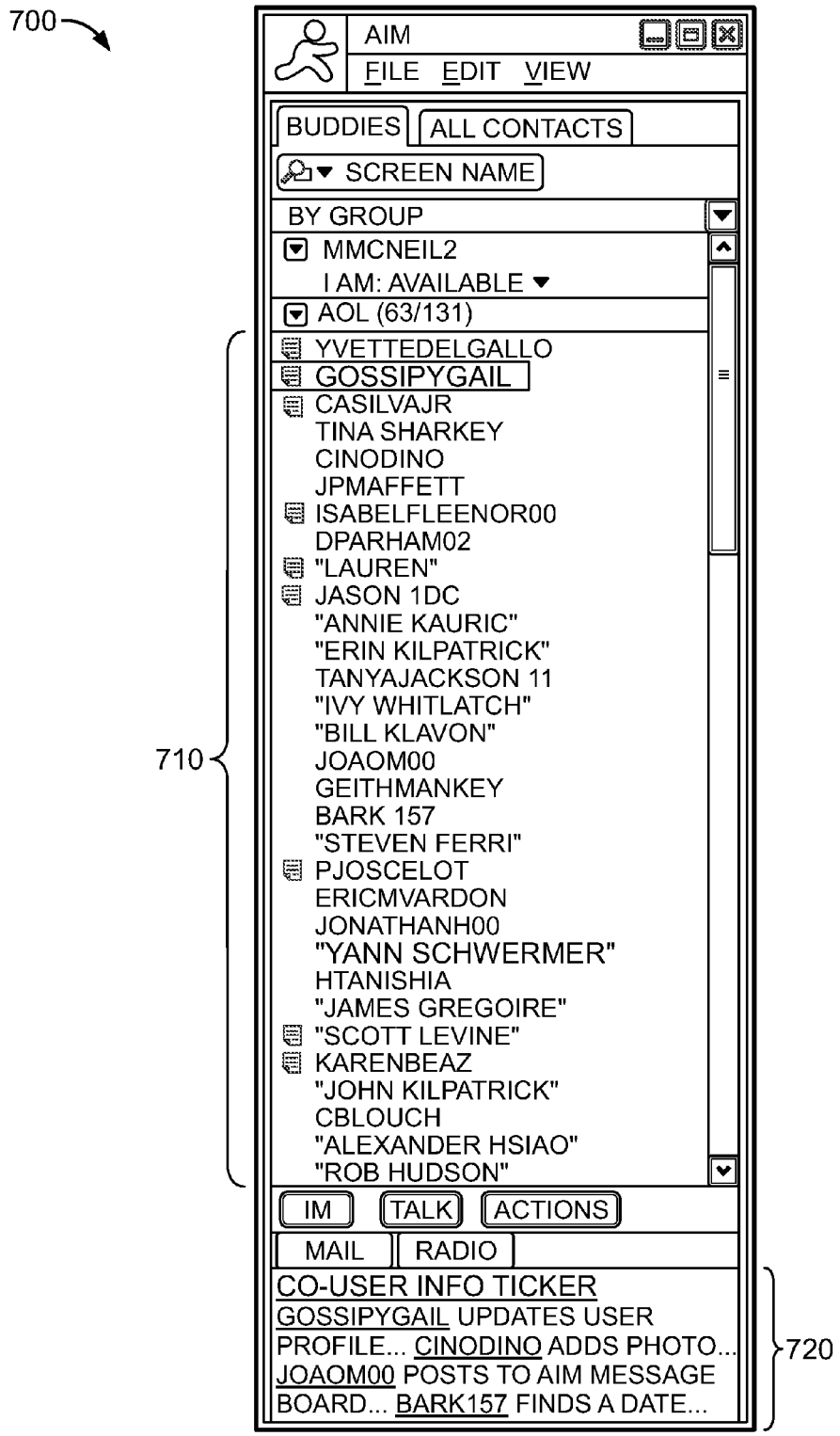
FIG. 7 illustrates an example of a co-user list that includes a co-user information ticker configured to provide recent content publication activity information for co-users known to a user who owns the co-user list.

Co-user list 700 of FIG. 7 includes a co-user information ticker configured to provide recent content publication activity information for co-users known to a user who owns the co-user list 700. Co-user list 700 is similar to co-user list 100 of FIG. 1 and includes names 710 of co-users who are known to the user MMcNeil2, who owns the co-user list 700.

Co-user list 700 differs from co-user list 100 of FIG. 1 in that rather than indicating recent content publication activity of a co-user by displaying a recent content publication activity icon in association with the co-user's name, co-user list 700 includes co-user information ticker 720 to provide recent content publication activity information. Co-user information ticker (or "crawler") 720 occupies a small space of a graphical user interface, here, the bottom portion of co-user list 700, and provides brief descriptions of co-user recent content publication activity information. The recent content publication activity information continuously scrolls across co-user information ticker 720 and may be updated as new recent content publication activity information becomes available.

In some implementations, the amount of information provided by co-user information ticker 720 may be adjusted based on preference information. For example, a particular user may indicate that the user desires to view no more than a threshold number (e.g., 100) of items in the co-user information ticker 720 during a particular time period (e.g., 24 hours). In another example, the particular user may indicate that the user desires to view only information associated with particular co-users or particular content in the co-user information ticker 720. Additionally, or alternatively, the amount of information provided by the co-user information ticker 720 may be determined based on a threshold level of information. The threshold level of information may be a level that has been determined to be useful to a majority of users. A useful level of information may, for example, include an amount of information that is large enough to be of interest to a user, but small enough to not be overwhelming In some implementations, a user can adjust the threshold level based on the user's personal preferences.

Co-user information ticker 720 is currently providing recent content publication activity information for co-users GossipyGail, Cinodino, JaoaM00, and bark157. More particularly, co-user information ticker 720 is currently indicating that (1) "GossipyGail updates user profile," (2) "Cinodino adds photograph," (3) JoaoM00 posts to AIM Message Board," and (4) "bark157 finds a date."

By selecting a co-user's name within co-user information ticker 720, a user may view content associated with the co-user's recent content publication activity and/or communicate with the co-user by, for example, initiating an instant messaging communications session or by some other means (not shown). For example, user MMcNeil2 selects co-user name bark157 within co-user information ticker 720 and is provided with a blog entry authored by co-user bark157 detailing his experiences on a dating website. In response to viewing this content, user MMcNeil2 sends an instant message (or email or text message) to co-user bark157 with a message requesting additional information about co-user bark157's experiences.

Figure 8:
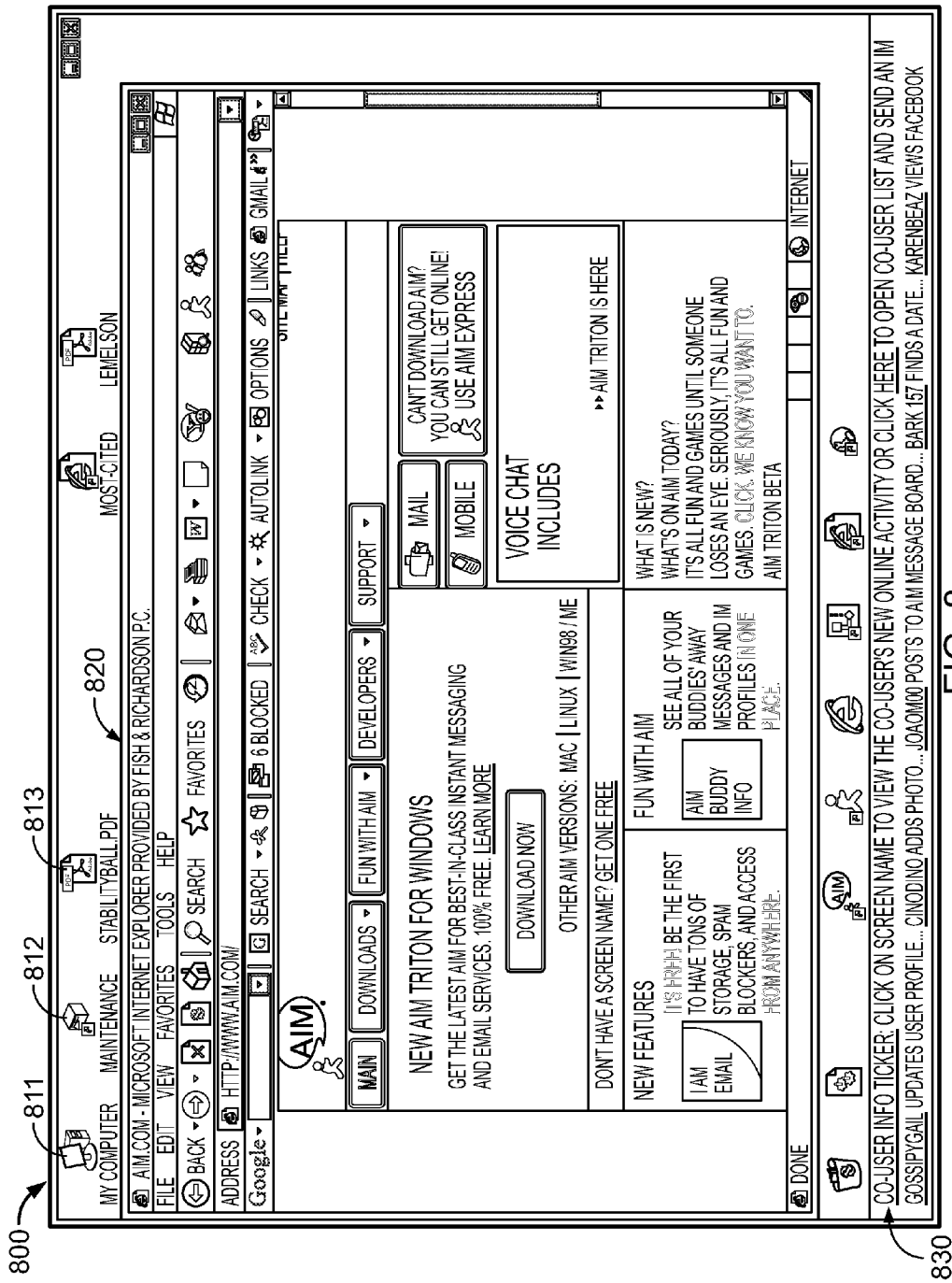
FIG. 8 illustrates an example of a GUI that represents a desktop display including a co-user information ticker.

GUI 800 of FIG. 8 represents a desktop display that includes a co-user information ticker 830. More particularly, GUI 800 is configured to display program and file icons (e.g., icons 811-813), as well as windows that display currently active programs (e.g., browser window 820 showing a web page www.aim.com). GUI 800 also displays co-user information ticker 830, which provides recent content publication activity information for co-users known to a user whose desktop display is being shown by GUI 800.

Co-user information ticker 830 of FIG. 8 is similar to co-user information ticker 720 of FIG. 7. However, rather than being displayed as part of a co-user list (e.g., co-user list 700 of FIG. 7), co-user information ticker 830 is displayed as a scroll bar at the bottom of a desktop display. Since co-user information ticker 830 is allowed to occupy a relatively larger display area than co-user information ticker 720 of FIG. 7, co-user information ticker 830 provides the user with instructions that invite the user to "Click on screen name to view the co-user's new online activity or click here to open co-user list and send an IM."

Figure 9:
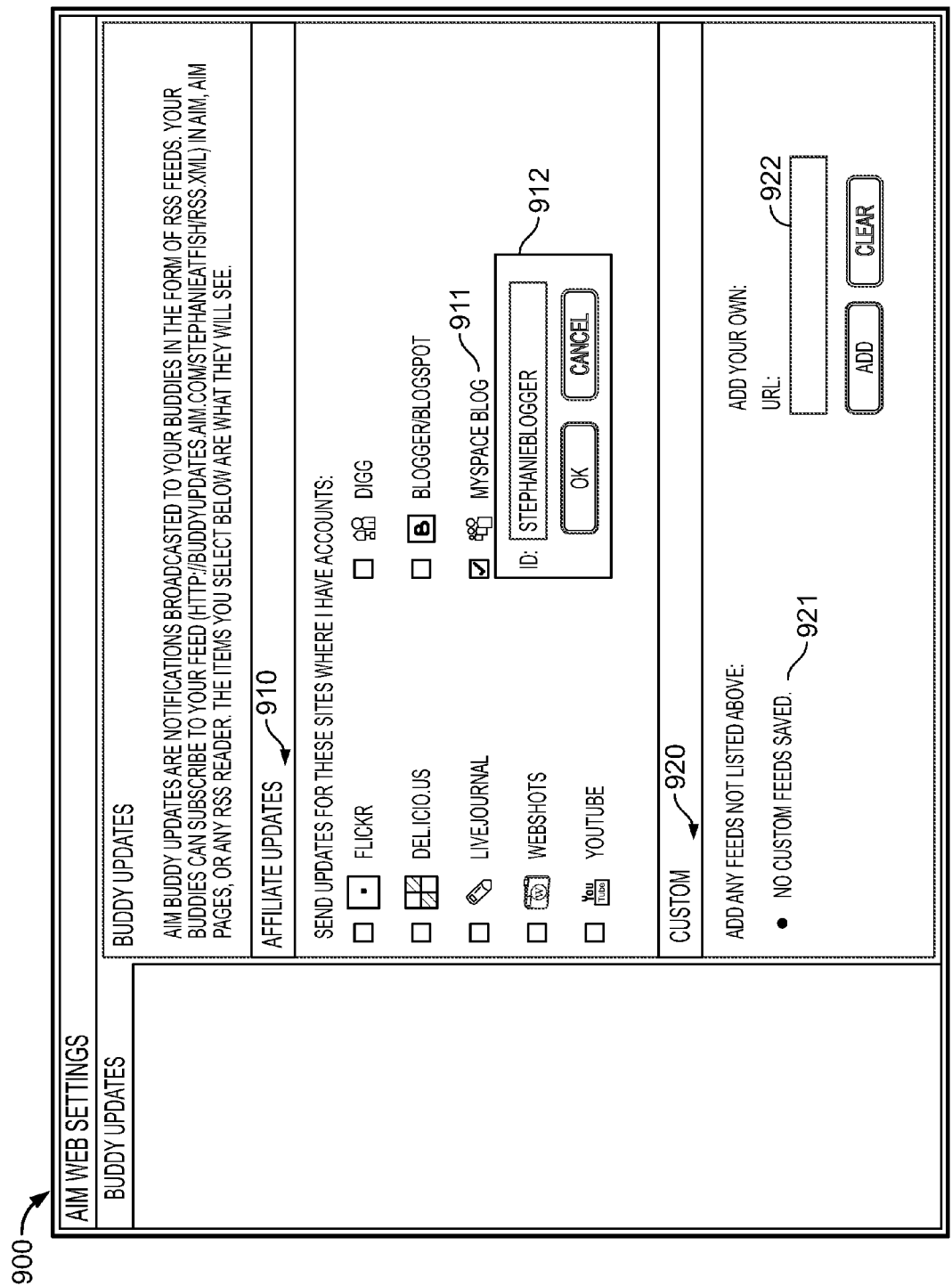
FIG. 9 illustrates an example of a GUI structured and arranged to enable a user to specify whether, and how, information regarding the user's recent content publication activity may be presented to other users.

GUI 900 of FIG. 9 is structured and arranged to enable a user to specify whether, and how, information associated with the user's recent content publication activity may be presented to other users. More particularly, GUI 900 enables a user to identify third party services for which the user wishes recent content publication activity to be published to other users.

A user may hold accounts with various third party service providers in addition to the user's instant messaging or online service provider accounts. An indication of creation of, or changes to, a particular third party account held by the user, may be provided to other users who also have accounts with the particular third party service providers. However, the user may wish to provide information related to recent content publication activity for the user's third party service provider accounts to other users who may, or may not, also have accounts with the third party service providers. Thus, in some implementations, the third party service provider accounts held by the user may be linked to the user's instant messaging or online service provider accounts in order to provide an indication of recent content publication activity to co-users who have a relationship with the user (e.g., have included the user on a co-user list).

To cause such linking to occur, the user may select one or more of a variety of known third party service providers 910 for which updates associated with the user's account are to be published to other users. For example, the user may choose to publish updates to accounts the user holds on Flickr, del.i-cio.us, or LiveJournal. Upon selection of a particular third party service provider, such as MySpace blog 911, a user is presented with a login pop-up window 912. The login pop-up window requests that the user provide information related to the user's third party account, such as, for example, a user ID and password (not shown). Here, the user has entered the user ID "StephanieBlogger" for the user's MySpace blog account.

Additionally, the user may choose to publish updates associated with one or more feeds 920. For example, the user may maintain a personal web page and may provide an RSS feed that provides information about the web page content. As such, the user may list this custom web page feed in GUI 900 in order to publish the user's recent content publication activity with respect to the user's web page for other users to view. As shown, the user has no custom feeds saved 921. To add a custom feed, the user can enter a uniform resource locator (URL) associated with the feed in the text entry box 922.

GUI 1000 of FIG. 10 is structured and arranged to enable a user to specify privacy settings for recent content publication activity information that may be provided to one or more co-users. More particularly, a user may use GUI 1000 to indicate types of recent content publication activity 1010 that may be published, recent content publication activity content 1020 that may be published, and co-users 1030 who may receive or access recent content publication activity information for the user.

Section 1010 of GUI 1000 enables a user to select particular types of recent content publication activity information to be published. In the example shown, the user has chosen to publish recent content publication activity related to away messages, the user's profile, journal entries, and photographs. However, the user has chosen not to publish recent content publication activity related to message board posts, a favorites list, the user's RSS feed subscriptions, and third party service provider accounts. In some implementations, if a user selects to publish recent content publication activity information for the user's third party service provider accounts, the user may be presented with GUI 900 of FIG. 9 to select the third party service provider accounts for which updates are to be published, and provide login information therefor.

Section 1020 of GUI 1000 enables a user to restrict recent content publication activity information from being published based on content associated with the recent content publication activity. In the example shown, the user has indicated that any recent content publication activity associated with content that is related to work, includes adult topics, and/or mentions particular people (the names of whom are provided by the user in a list text entry box) should not be published. Recent content publication activity associated with content that is related to family, includes strong language, referencing feed subscriptions, or includes any one of a list of user-provided words, also may be restricted using section 1020 of GUI 1000.

Section 1030 of GUI 1000 enables a user to select particular co-users, or classes of co-users, who may receive, or access, recent content publication activity information associated with the user. In the example shown, the user has indicated that recent content publication activity information may be provided to people in a contact list (e.g., an address book) associated with the user, co-users associated with particular co-user classes (e.g., the selected classes include friends, coworkers, and law school pals), and people whose names are provided by the user in a list text entry box. Other categories of users that may receive, or access, recent content publication activity information include all co-users and all users in a particular social network (e.g., an AIM social network, an AOL social network, or another social network associated with a content service provider or an online service provider). The user also may indicate that no co-users may access, or receive, recent content publication activity information associated with the user.

In some implementations, the user may indicate that a particular co-user may receive, or access, recent content publication activity only at times when the particular co-user is associated with a co-user identity selected by the co-user from among several co-user identities belonging to the co-user. For example, a co-user Mom may have multiple co-user identities—namely, a teacher co-user identity (represented by the screen name "TeacherMom"), a friend co-user identity (represented by the screen name "FriendMom"), and a parent co-user identity (represented by the screen name "Mom"). As such, and for example, the user may indicate that recent content publication activity associated with a family photo album (e.g., family content) may be received or accessed by co-user Mom when the co-user is using the "Mom" screen name, and that recent content publication activity associated with educational topics may be received or accessed by co-user Mom when the co-user is using the "TeacherMom" screen name.

The GUI 1000 also includes checkbox 1040 which enables a user to stop all notifications of recent content publication activity from being published. A user may choose to do so on a permanent, or temporary, basis. For example, a user may be intent on updating a large number of digital assets in a short period of time, and, in an effort not to bombard the user's friends with recent content publication activity information regarding these updates, the user may select checkbox 1040 for the time being, and then un-select checkbox 1040 when the user wishes to reinstate normal settings regarding recent content publication activity information.

Figure 11:
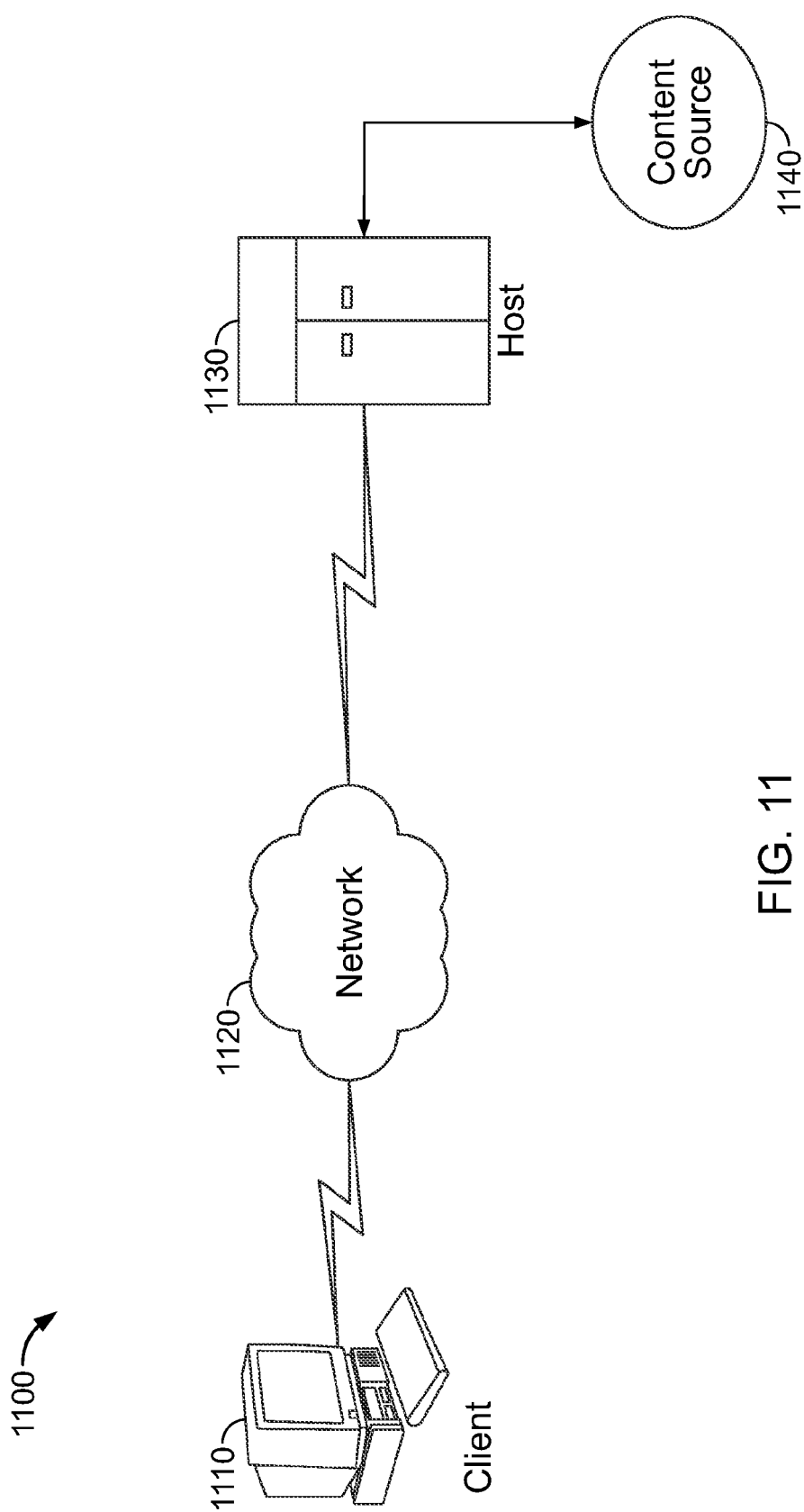
FIG. 11 illustrates an example of a communications system that includes a host configured to monitor a content source to identify recent content publication activity by one or more co-users and provide information associated with the recent content publication activity to a client for presentation to a user.

Communications system 1100 of FIG. 11 includes a host 1130 configured to monitor a content source 1140 to identify recent content publication activity by one or more co-users and provide information associated with the recent content publication activity to a client 1110 for presentation to a user.

Each of the client 1110 and the host 1130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 1110 and host 1130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 1110 or the host 1130.

The client 1110 may include one or more devices capable of accessing content on the host 1130. The host 1130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 1110 includes one or more information retrieval software applications (e.g., a browser, a mail application, an instant messaging client, an Internet service provider client, a media player, or another integrated client) capable of receiving one or more data units. The information retrieval applications may run on a general-purpose operating system and a hardware platform that includes a general-purpose processor and specialized hardware for graphics, communications and/or other capabilities. In another implementation, the client 1110 may include a wireless telephone running a micro-browser application on a reduced operating system with general purpose and specialized hardware capable of operating in mobile environments.

The network 1120 includes hardware and/or software capable of enabling direct or indirect communications between the client 1110 and the host 1130. As such, the network 1120 may include a direct link between the client 1110 and the host 1130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 1130 may include a general-purpose computer having a central processor unit (CPU), and memory/storage devices that store data and various programs such as an operating system and one or more application programs. Other examples of a host 1130 includes a workstation, a server, a special purpose device or component, a broadcast system, other equipment, or some combination thereof capable of responding to and executing instructions in a defined manner. The host 1130 also may include an input/output (I/O) device (e.g., video and audio input and conversion capability), and peripheral equipment such as a communications card or device (e.g., a modem or a network adapter) for exchanging data with the network 1120.

The host 1130 is generally capable of executing instructions under the command of a controller. The host 1130 may be used to provide content to the client 1110. The controller may be implemented by a software application loaded on the host 1130 for commanding and directing communications exchanged with the client 1110. Other examples of the controller include a program, a piece of code, an instruction, a device, a computer, a computer system, or a combination thereof, for independently or collectively instructing the client 1110 or the host 1130 to interact and operate as described. The host 1130 may be embodied permanently or temporarily in any type of machine, component, physical or virtual equipment, storage medium, or propagated signal capable of providing instructions to the client 1110 or the host 1130.

The host 1130 is configured to access and monitor a content source 1140. The content source 1140 represents one or more data stores configured to store community assets, communication assets, and digital assets that are owned by co-users. The one or more data stores may be located on the host 1130, at a remote server, on a client device, associated with a particular third party service provider, or otherwise configured to store such assets and information.

As a co-user creates or edits information related to the co-user's community, communication with others, or digital assets (e.g., engages in recent content publication activity), the content source 1140 is configured to acknowledge this recent content publication activity due to the storage of an asset to which the recent content publication activity relates at the content source 1140. For example, if a particular co-user adds a photograph to a photograph album owned by the particular co-user, the content source 1140 acknowledges the recent content publication activity performed by the particular co-user.

As such, and in some implementations, the host 1130 may monitor the content source 1140 in order to receive indications of recent content publication activity by particular co-users. For example, the host 1130 may monitor the content source 1140 for recent content publication activity related to co-user GossipyGail. If the content source 1140 acknowledges recent content publication activity performed by co-user GossipyGail, the host 1130 may produce an indication of the recent content publication activity based on the monitoring. Additionally, or alternatively, the content source 1140 may access a host subscription list to determine whether to provide the host 1130 with an indication of recent content publication activity for a particular co-user if such recent content publication activity is acknowledged by the content source 1140. For example, the host 1130 adds the co-user name GossipyGail to a host subscription list in order to indicate that it should receive indications from the content source 1140 for recent content publication activity related to co-user GossipyGail. If the content source 1140 acknowledges that co-user GossipyGail has engaged in recent content publication activity, the content source 1140 accesses the host subscription list, determines that the host 1130 desires recent content publication activity information for GossipyGail, and provides the host 1130 with an indication of the recent content publication activity.

In some implementations, the host 1130 may include a search component (e.g., a search engine) configured to identify and return search results in response to receipt of a query from a user. The query may be received by client 1110 from the user and transmitted to the host 1130 via the network 1120.

The search component may be configured to access information associated with content publication activity of one or more co-users, such as, for example, an index of the content publication activity of a particular co-user. The content publication activity may be indexed on a per-co-user basis. For example, a particular index may be generated for all content publication activity of a particular co-user. The index may include one or more keywords (e.g., recipes, sports, or computers) and other information (e.g., content publication activity type, such as user profile, photograph, or blog) associated with the content publication activity of a co-user. Additionally, or alternatively, the search component may be configured to directly access content associated with content publication activity of one or more co-users. For example, the search component may access content (e.g., text) associated with a blog entry. The information associated with the content publication activity of the co-users may be stored within, or in association with, content source 1140.

The information associated with the content publication activity accessed by the search component may be limited to information associated with content publication activity performed by co-users who are known to the user who has provided the query. For example, a user may request search results for a query, and, in response, the search component may access content publication activity information associated with co-user online identifiers that have been included by the user in a co-user list owned by the user. In some implementations, the search component may access content publication activity information associated with all, or a subset of, co-users who are known to the user who provided the query.

In some implementations, content publication activity associated with a particular co-user may be stored local to the particular co-user, rather than being stored in association with host 1130 (e.g., at content source 1140). As such, the search component may be configured to access content publication activity information for the particular co-user only when the particular co-user is online (e.g., logged into the instant messaging application) and the content publication activity is available for access to the search component.

The search component may identify search results in response to a query by identifying matches between the query and keywords included in a particular content publication activity index or content associated with a particular content publication activity. Additionally, or alternatively, the search component may identify search results by identifying similarities between the query and keywords included in a particular content publication activity index or content associated with a particular content publication activity.

Once the search component identifies search results, the host 1130 may be configured to transmit the search results to the client 1110 via the network 1120. The client 1110 may be configured to receive the search results and enable the user who provided the query to perceive the search results.

The host 1130 may be configured to log and store instant message (or e-mail) transcripts (including, for example, conversation text, image descriptions, file transfer descriptions, audio files of voice-over-IP (VoIP) conversations, and speech-to-text transcripts of VoIP conversations) between a user and one or more co-users who are known to the user. As such, the search component may be configured to access stored instant message transcripts and identify transcripts that include content that matches, or is similar to, a query provided by the user. Upon identification of search results for a query from among the stored transcripts, the host 1130 may be configured to transmit the transcript search results to the client 1110 via the network 1120, as discussed above.

Figure 12:
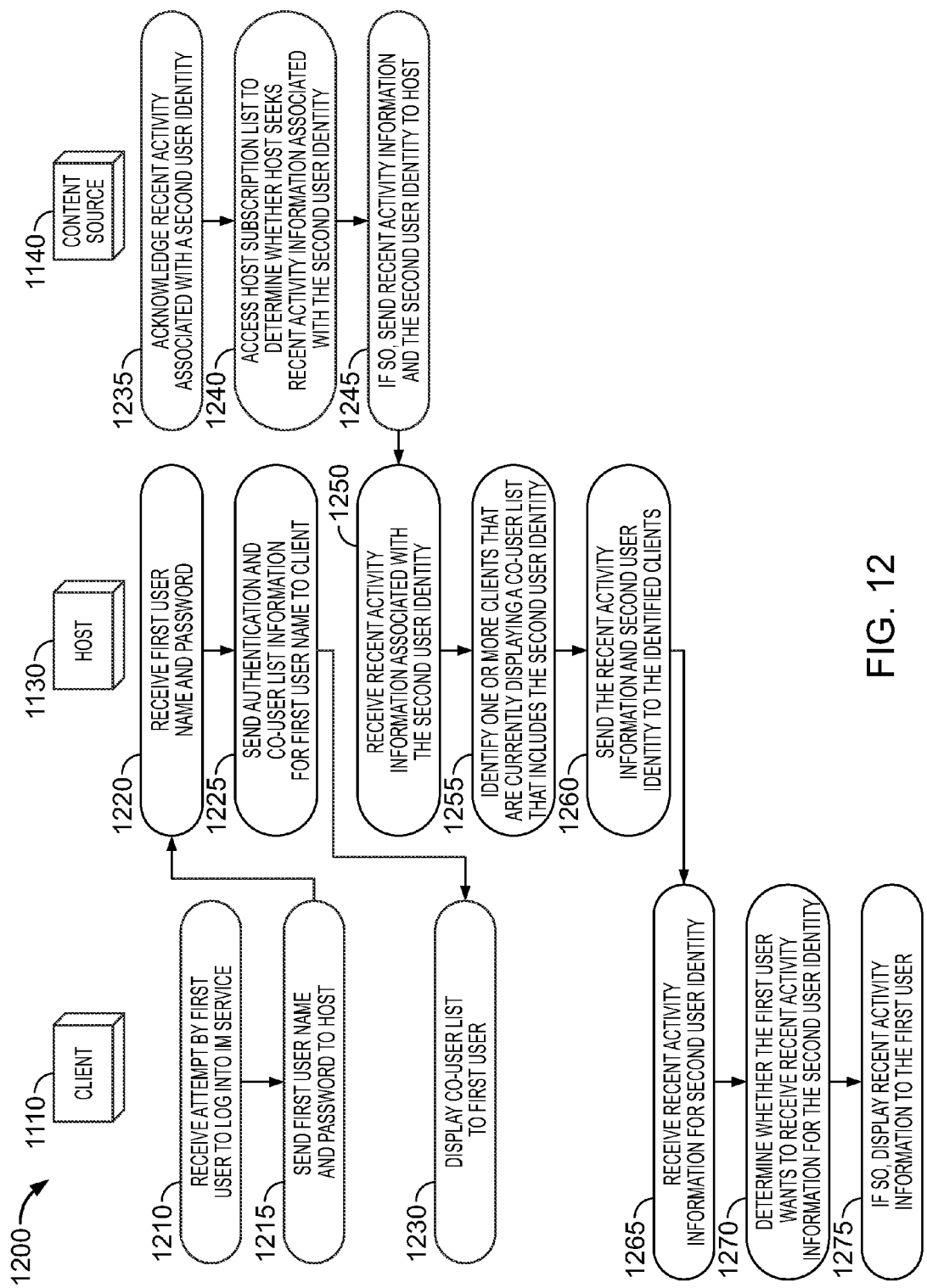
FIG. 12 illustrates a flow chart of an example of a process by which recent content publication activity information for a co-user is displayed.

Flow chart 1200 of FIG. 12 shows an example of a process by which recent content publication activity information for a co-user is displayed. For convenience, particular components described with respect to FIG. 11 are referenced as performing the process of flow chart 1200. However, similar methodologies may be applied in other implementations where different components are used to define the structure of the system, or where the functionality is distributed differently among the components shown by FIG. 11.

The client 1110 receives an attempt by a first user to log into an IM service (1210). For example, a user associated with the screen name MMcNeil2 provides a first user name (e.g., screen name) and password to an IM service application. The client 1110 sends the first user name and password to the host 1130 (1215), which is received by the host 1130 (1220).

The host 1130 sends authentication and co-user list information for the first user name to the client 1110 (1225). More precisely, the host 1130 compares the first user name and password with known user name-password combinations, and, if a match is found, provides an indication that the first user is authorized to access the IM service with the first user name.

The co-user list information for the first user includes screen names associated with co-users known to the first user (e.g., stored in a contact list associated with the first user), as well as status information (e.g., online, offline, available, or away) and other identification information (e.g., away messages and avatars) associated with each of the screen names. Based on the co-user list information, client 1110 displays a co-user list to the first user (1230). For example, the co-user list 100 of FIG. 1, which includes a screen name for co-user GossipyGail, is displayed by client 1110 for first user MMcNeil2.

The content source 1140 acknowledges recent content publication activity associated with a second user identity (1235). For example, the content source 1140 acknowledges that co-user GossipyGail has updated a list of favorite songs within the co-user's user profile to include the song "Pink Cadillac" by Aretha Franklin.

The content source 1140 accesses a host subscription list to determine whether the host 1130 seeks the recent content publication activity information associated with the second user identity (1240). As described above, the host 1130 may seek recent content publication activity information for particular co-users. The particular co-users are identified based on user preference information (e.g., co-users for which a user is interested in receiving recent content publication activity information, as described above) and co-user publication permissions (e.g., recent content publication activity information that the co-user allows to be published, as described above). Furthermore, and in some implementations, the list of particular co-users may include only those co-users whose screen names are presently displayed on a co-user list (e.g., those co-users who are currently online or available). For example, the host 1130 may seek recent content publication activity information for co-user GossipyGail, whose screen name is currently being displayed on the co-user list owned by user MMcNeil2. Thus, by accessing the host subscription list, the content source 1140 determines that the host 1130 seeks to receive recent content publication activity information for co-user GossipyGail.

If the host subscription list indicates that the host 1130 seeks recent content publication activity information associated with the second user identity, the content source 1140 sends the recent content publication activity information and the second user identity to the host 1130 (1245). For example, the content source 1140 sends recent content publication activity information indicating that co-user GossipyGail has updated her user profile.

The host 1130 receives the recent content publication activity information associated with the second user identity (1250). The host 1130 identifies one or more clients that are currently displaying a co-user list that includes the second user identity (1255). For example, the client 1110 is currently displaying a co-user list owned by user MMcNeil2 that includes the screen name GossipyGail. The host 1130 sends the recent content publication activity information and associated second user identity to the identified clients (1260). For example, the host 1130 sends the indication that GossipyGail has updated her user profile to the client 1110.

The client 1110 receives the recent content publication activity information for the second user identity from the host 1130 (1265). The client 1110 determines whether the first user desires to receive the recent content publication activity information associated with the second user identity (1270). For example, the client 1110 may access user preference information for the user MMcNeil2 to determine whether the user MMcNeil2 has indicated a preference to view recent content publication activity information for co-user GossipyGail, and, more particularly, whether the user MMcNeil2 has indicated a preference to receive an indication that the co-user GossipyGail has updated her user profile.

If the client 1110 determines that the first user wishes to receive recent content publication activity information associated with the second user identity, the client 1110 displays an indication of the recent content publication activity to the first user (1275). As described above, recent content publication activity information may include an icon displayed in association with the second user identity in a co-user list, an icon or text within a user profile, an icon or text displayed along with the second user identity in a co-user information ticker, or some other way of indicating that recent content publication activity information is available and for a particular co-user associated with the second user identity.

Figure 13:
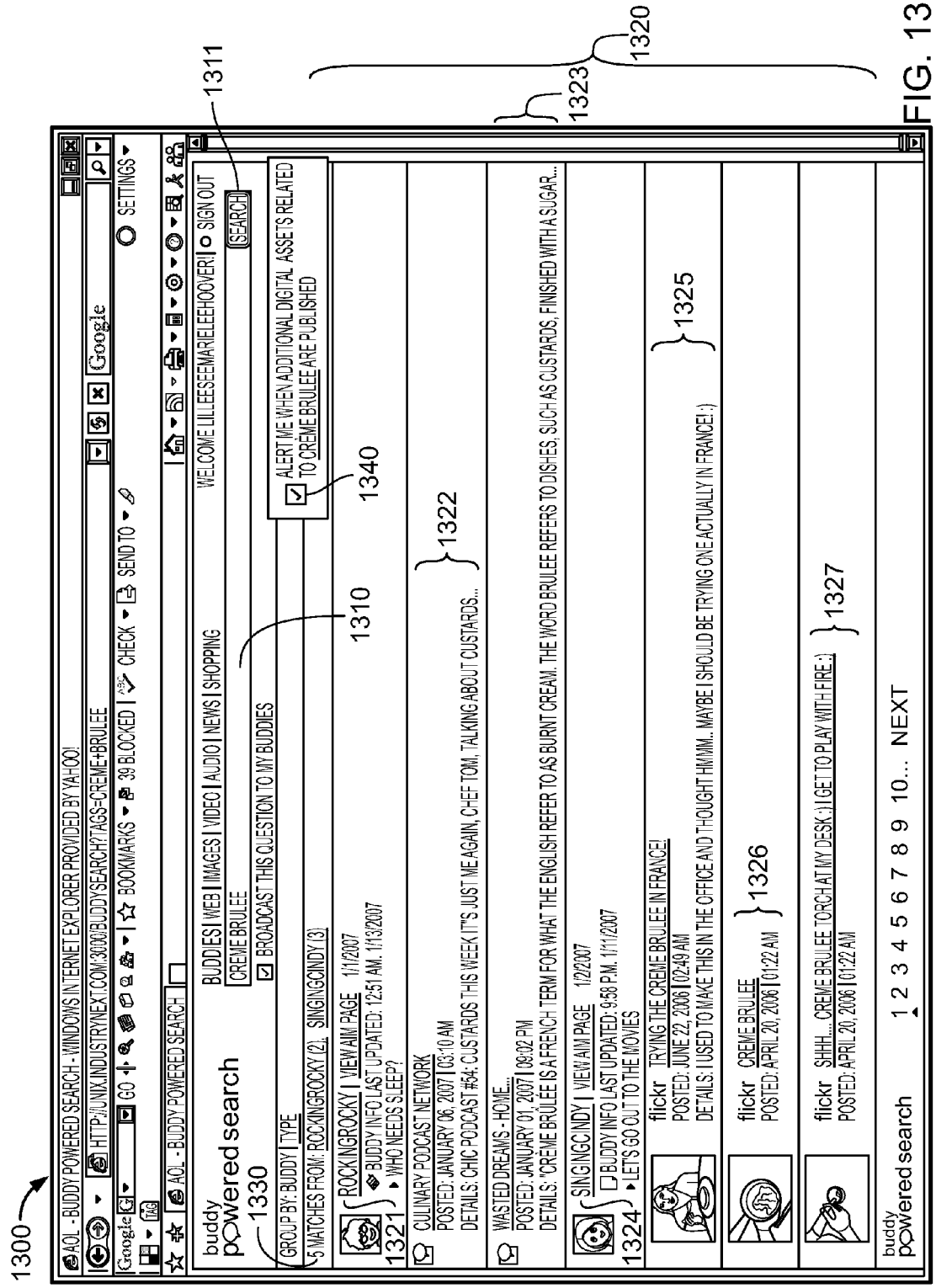
FIG. 13 illustrates an example of a GUI that includes a display by which a user is enabled to search information associated with content publication activity by one or more co-users who are known to the user.

In addition to enabling a user to be notified when a co-user who is known to the user engages in recent content publication activity, in some implementations, the user may be enabled to search content publication activity of the co-users known to the user for particular information. As such, GUI 1300 of FIG. 13 illustrates a display by which a user is enabled to search information associated with content publication activity by one or more co-users who are known to the user. More particularly, GUI 1300 enables a user to search for content publication activity associated with a co-user who is included in the user's co-user list.

GUI 1300 includes text entry field 1310 in which a user may provide a query. For example, and as shown, a user has provided the query "crème brulee." By selecting "Search" control (e.g., button) 1311, the user may initiate a search for content publication activity that is related to the query "crème brulee."

GUI 1300 also includes search results 1320 that have been identified as being related to the query "crème brulee." Search results 1320 have been organized, and presented, based on determining that a co-user is associated with the content publication activities that have been provided as search results. Two items 1322 and 1323 of content publication activity that have been identified as being related to "crème brulee" are associated with co-user RockingRocky 1321, and three items 1325, 1326, and 1327 of content publication activity related to "crème brulee" are associated with co-user SingingCindy 1324 For each of the co-users associated with the content publication activity provided as search results, information about the co-user is provided, such as, for example, a date and time when the co-user's personal information (e.g., profile information) was last updated, an away message published by the co-user, an avatar associated with the co-user, and a hyperlink to view a user profile page associated with the co-user.

A posting on the Culinary Podcast Network 1322 and a document entitled "Wasted Dreams" 1323, both of which are associated with co-user RockingRocky, have been identified as being related to "crème brulee." The items 1322 and 1323 may be associated with co-user RockingRocky because, for example, the co-user viewed the items and applied a bookmark or tag thereto (e.g., by bookmarking and tagging the items using del.icio.us). In another example, the items 1322 and 1323 may be associated with RockingRocky because the co-user posted or otherwise created the items (e.g., the items represent posts to the co-user's personal podcast or blog). For each of items 1322 and 1323, information, such as a date and time when the item was posted (e.g., published) by RockingRocky, is provided, along with details associated with the items.

The items 1325-1327 are images (e.g., photographs) that have been added to a Flickr account associated with co-user SingingCindy. Item 1325 includes an image of co-user SingingCindy eating crème brulee in France, and items 1326 and 1327 are images of crème brulee desserts. For each of items 1325-1327, information, such as a date and time when the item was posted (e.g., published) by SingingCindy, is provided along with details associated with the items, such as a description of the images. In addition, a thumbnail, or other preview of the image, is provided for each item.

GUI 1300 also includes a search result summary 1330, which indicates that five matches for the query "crème brulee" have been identified, and that two of those matches represent content publication activity associated with co-user RockingRocky. Three of those matches represent content publication activity associated with co-user SingingCindy.

In some instances, in addition to receiving indications of recent content publication activity by co-users known to a user, the user may desire to be specifically alerted when a co-user engages in recent content publication activity that is related to a search that was previously performed by the user. In some implementations, the user may indicate that the user wishes to be notified when a co-user's recent content publication activity is related to a particular and previously entered query, such as, for example, the query "crème brulee." To do so, the user may select checkbox 1340 within GUI 1300.

However, in other implementations, a user may automatically be notified whenever a co-user who is known to the user has engaged in recent content publication activity that is identified as being related to a search of content publication activity that was previously performed by the user. For example, the user may perform a search for content publication activity related to "crème brulee" at an earlier time and immediately be provided with search results associated with content publication activity that has already been published by co-users RockingRocky and SingingCindy, such as the search results shown in GUI 1300 However, at a later time, co-user GossipyGail may publish a recipe for crème brulee to her blog. As such, and as discussed in more detail below, the user may not only be notified that co-user GossipyGail has engaged in recent content publication activity, as discussed above, but also may be alerted to the fact that the recent content publication activity by "GossipyGail" relates to the user's recent search for "crème brulee."

A user may be notified of recent content publication activity that is related to a prior query entered by the user based on an amount of time that has passed since the user entered the query. For example, a query may be stored (e.g., in a query log) for six months, after which the user may no longer be specifically notified of recent content publication activity that is related to the query. Additionally, or alternatively, the user may select a time period after which queries expire so that content publication activity associated with the query is no longer identified for the user. Similarly, a user may be notified of recent content publication activity that is identified as being related to a particular number of past queries. The particular number of queries may be selected by a user or may be a default number. For example, the user may receive a notification of content publication activity that is related to the past 50 queries provided by the user. As the user performs additional searches (and enters additional queries), the list of queries for which the user may receive specific notifications may be updated to include the newest query and discard the oldest query. A user also may be enabled to manually select categories or classifications of queries for which the user desires to automatically receive notifications of related recent content publication activity.

In some implementations, a user may be enabled to interact with past queries that have been stored in, for example, a query log. The user may do so via a GUI. The user's interactions with the query log may include deleting queries from the log, or adding additional queries to the log. The user also may be enabled to edit queries in the log, by, for example, adding a note to a particular query that describes the information the user was attempting to locate using the particular query, narrowing a particular query by adding additional terms or constraints to the particular query, or broadening a particular query by removing terms or constraints from the particular query.

Figure 14:
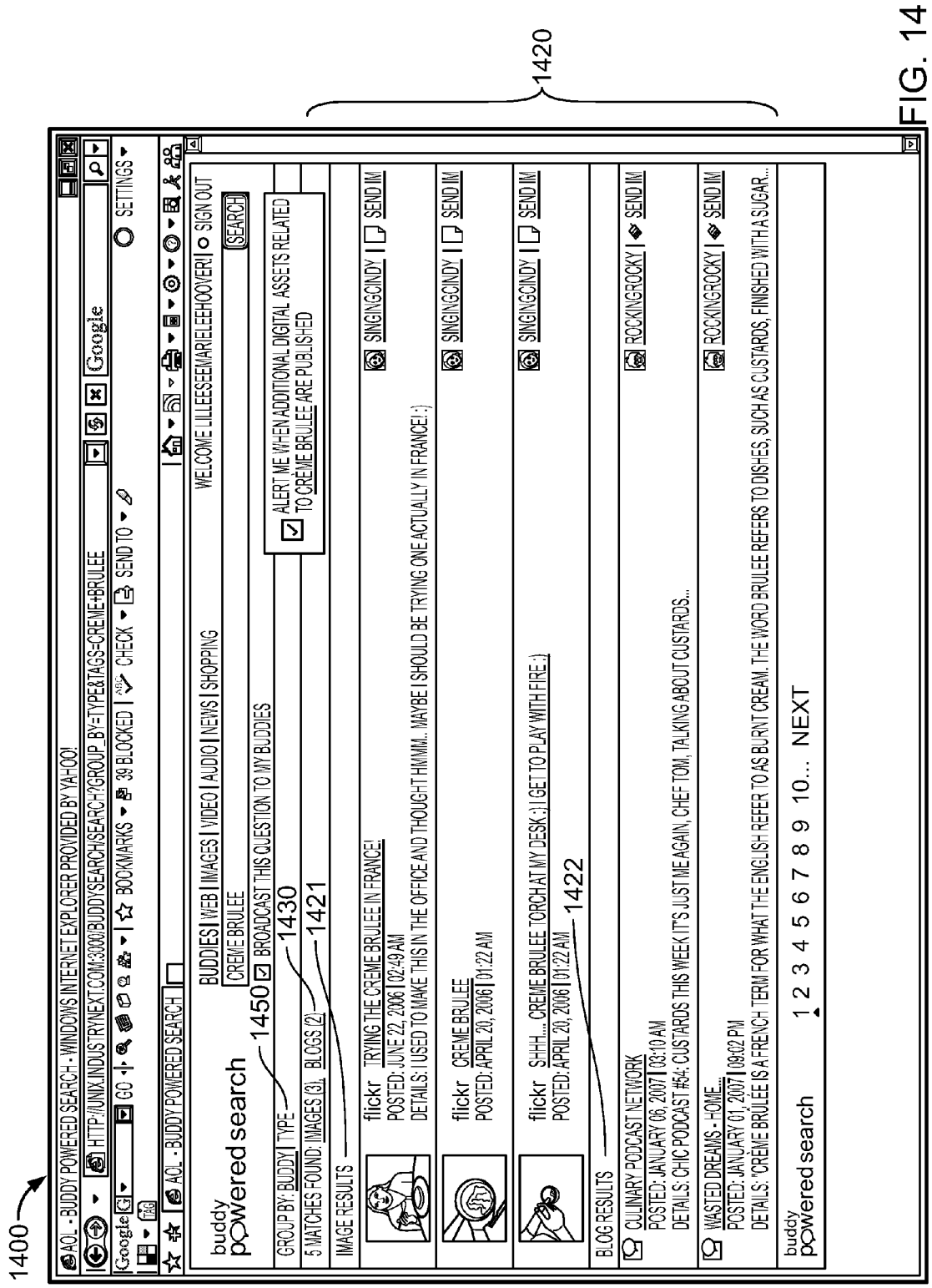
FIG. 14 illustrates an example of a GUI structured and arranged to enable a user to search information associated with content publication activity by one or more co-users who are known to the user.

Similar to GUI 1300, GUI 1400 of FIG. 14 is structured and arranged to enable a user to search information associated with content publication activity by one or more co-users who are known to the user. In GUI 1300, the search results 1320 are organized and presented to the user based on determining that the co-users are associated with the content publication activities provided. In GUI 1400, and in contrast, search results 1420, which are substantively the same as search results 1320 of GUI 1300, are organized and presented to the user based on a type of content publication activity.

As shown, search results 1420 have been organized into two categories—namely image results 1421 and blog results 1422. For each search result, details associated with the content publication activity, such as a description of the search result and a preview of the search result (e.g., a thumbnail preview of an image), as well as an indication of the co-user associated with the content publication activity, is provided.

GUI 1400 includes a search result summary 1430, which indicates that five matches have been found for the query "crème brulee," and that three of the matches are images and two of the matches are blogs.

GUI 1400 enables a user to change the organization and presentation of the search results by selecting one of hyperlinks 1450. Hyperlinks 1450 include a "buddy" hyperlink and a "type" hyperlink. In order to view the search results organized by type, and as shown in GUI 1400, the user selects the "type" hyperlink. In order to view the search results organized by co-user, and as shown in GUI 1300, the user selects the "buddy" hyperlink.

Figure 15:
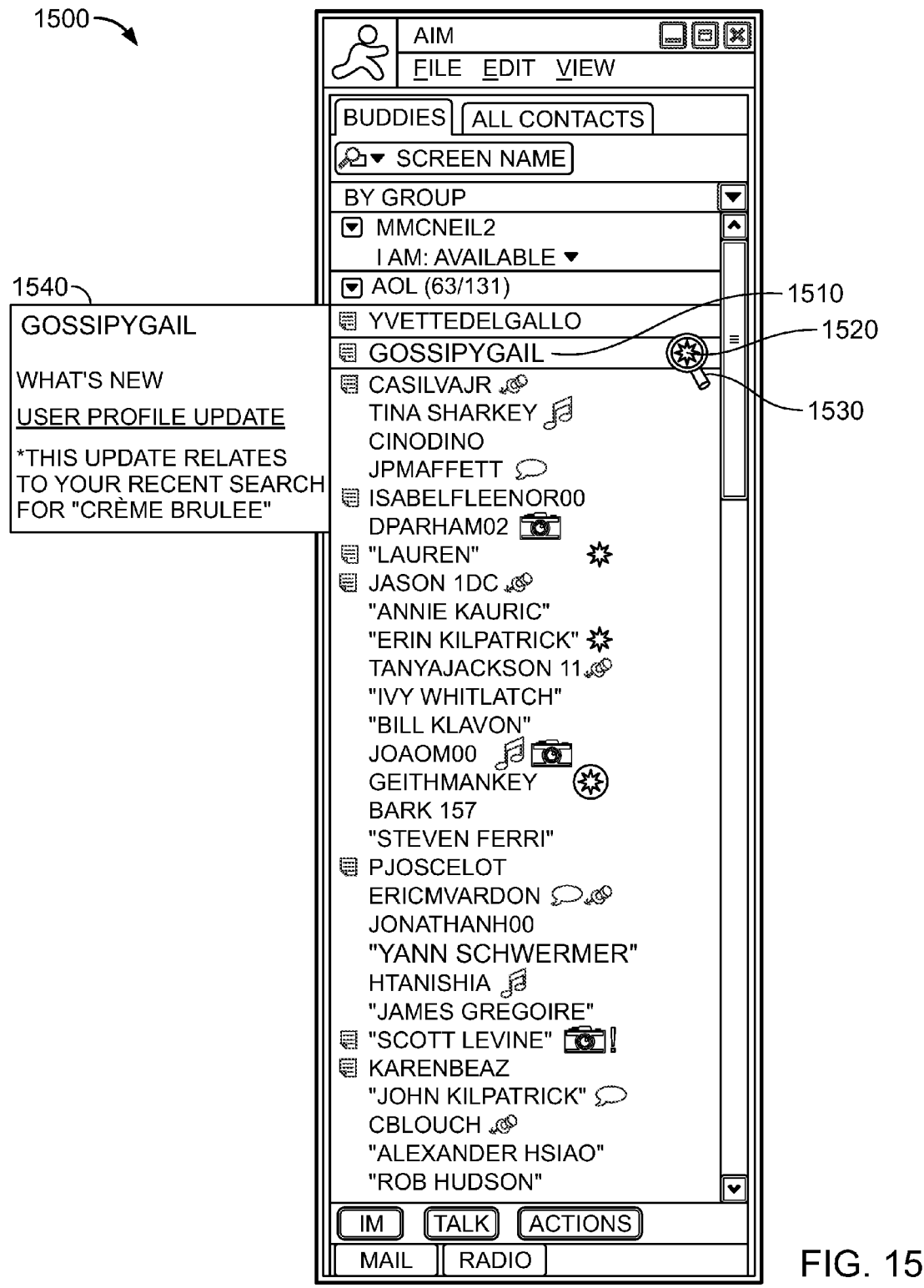
FIG. 15 illustrates an example of a co-user list configured to notify a user of recent content publication activity that is related to a recent search performed by the user.

Co-user list 1500 of FIG. 15 is configured to notify a user of recent content publication activity that is related to a recent search performed by the user. Co-user list 1500 includes a name associated with a co-user GossipyGail 1510. In association with the co-user name GossipyGail, a star recent content publication activity icon 1520 is displayed. The star icon 1520 indicates that a user profile associated with co-user GossipyGail has been updated.

A search notification icon 1530, in the shape of a magnifying glass, is displayed over the star icon 1520. The search notification icon 1530 notifies the owner of co-user list 1500 that the recent content publication activity being referenced by star icon 1520 is related to a search that was previously performed by the user.

The owner of co-user list 1500 receives more information about the recent content publication activity associated with GossipyGail's user profile, including information about the search to which the search notification icon 1530 refers. To do so, the user selects the star icon 1520 by, for example, hovering a pointer device (e.g., a mouse) over the icon, or the user may select the co-user name GossipyGail (e.g., by clicking on, hovering a pointer device over, or otherwise selecting).

As shown, the user has selected co-user name GossipyGail 1510. In response, a tooltip (or pop-up or bubble notification) 1540 is presented. The tooltip 1540 displays information about GossipyGail's recent content publication activity, referred to as "What's New." More particularly, tooltip 1540 indicates that the recent content publication activity referenced by star icon 1520 is an update to a user profile and that the search referenced by search notification icon 1530 is the user's previous search related to the "crème brulee" query.

In some implementations, a user may be notified that recent content publication activity by a co-user is related to a search previously performed by the user in a manner other than display of an icon in a co-user list. The user may receive a notification in an instant message or e-mail sent directly to the user. The notification may be presented to the user as part (e.g., a banner or margin) of a web page that the user visits frequently, such as, for example, a portal. A notification may be provided to the user as a pop-up or other indication in a GUI provided to the user for searching recent content publication activity or web content, such as, for example, one of GUI 1300 or GUI 1400.

Figure 16:
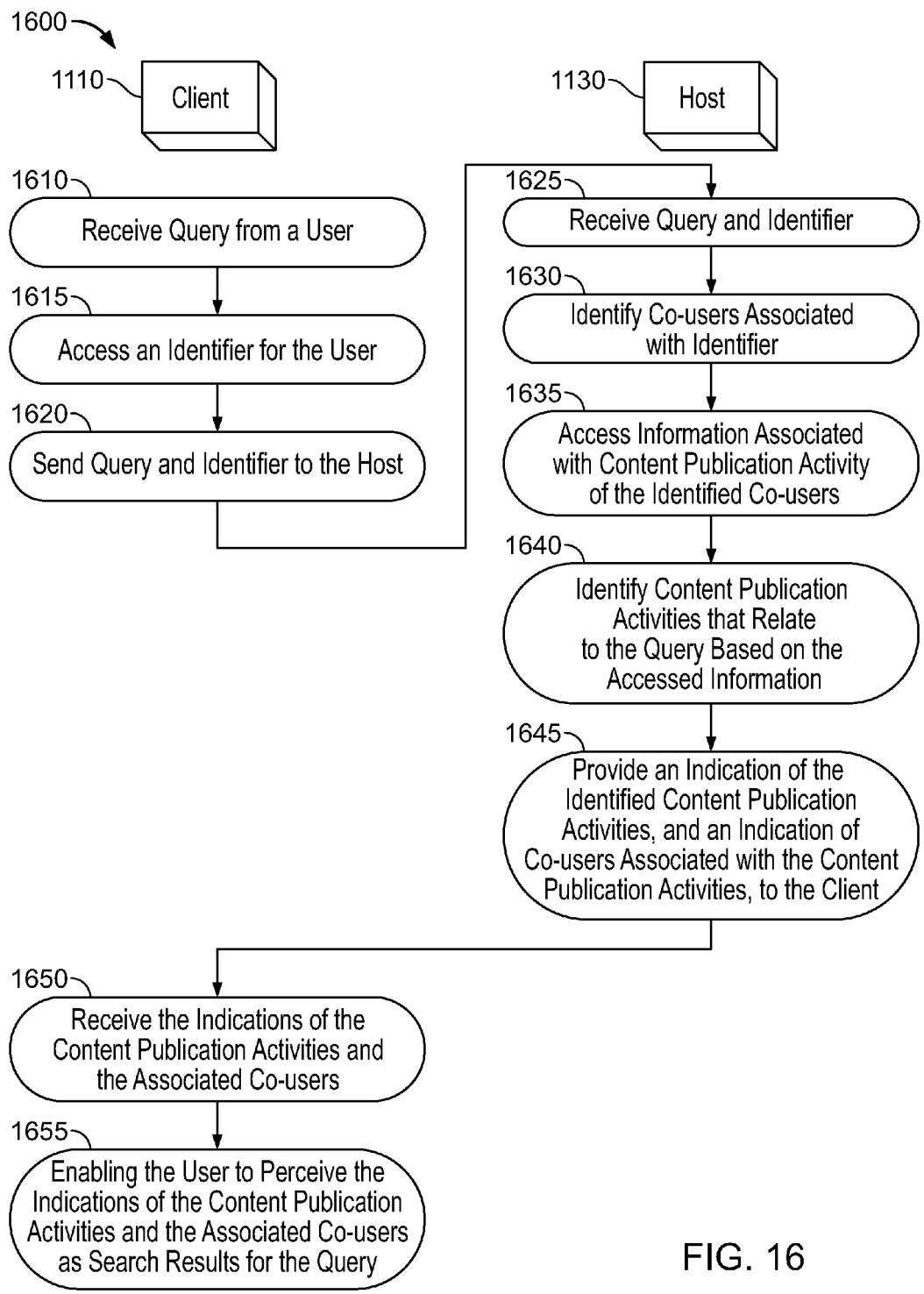
FIG. 16 illustrates a flow chart of an example of a process by which content publication activities that relate to a query are provided to a user as search results for the query.

Flow chart 1600 of FIG. 16 shows an example of a process by which content publication activities that relate to a query are provided to a user as search results for the query. For convenience, particular components described with respect to FIG. 11 are referenced as performing the process of flow chart 1600. However, similar methodologies may be applied in other implementations where different components are used to define the structure of the system, or where the functionality is distributed differently among the components shown by FIG. 11.

Client 1110 receives a query form a user (1610). The user may enter the query using, for example, text entry box 1310 of GUI 1300. For example, the user provides the query "crème brulee."

Client 1110 accesses an identifier for the user (1615). The identifier may be, for example, a screen name or other identifier (e.g., email address), associated with the user, and with which the user has logged into a particular system or social network. For example, the user may have logged into an instant messaging application (e.g., AIM) with a particular screen name prior to entering the query. Additionally or alternatively, the identifier may be an Internet Protocol (IP) address associated with the client 1110, and which may be used to identify the user.

Client 1110 sends the query and identifier to the host 1130 (1620), which receives the query and identifier from the client 1110 (1625). The client 1110 sends the query and the identifier to the host 1130 via the network 1120.

Host 1130 identifies co-users associated with the identifier (1630). For example, the host 1130 accesses a list of co-users that is associated with the user. The co-users may be those that have been included by the user in a co-user list, such as, for example co-user list 100 of FIG. 1 or co-user list 1500 of FIG. 15.

Host 1130 accesses information associated with content publication activity of the identified co-users (1635). In some implementations, content publication activity for each co-user may be indexed. For example, one or more keywords (e.g., recipes, sports, or computers) and other information (e.g., content publication activity type, such as user profile, photograph, or blog) may be associated with recent content publication activity for a particular user. In this case, host 1130 may access such a content publication activity index for each of the identified co-users. Additionally, or alternatively, host 1130 may directly access content associated with the content publication activities of the identified co-users.

In some implementations, the host 1130 also may access information associated with the identified co-users other than content publication activity, such as, for example, instant message (or e-mail) transcripts, that represent conversations between the user and one or more of the identified co-users. The transcripts may be stored on client 1110 or at host 1130.

As the user's relationships with the co-users who are known to the user changes (e.g., the user adds or deletes co-users from the user's social network by, for example, adding or deleting co-users from a co-user list owned by the user), the information associated with content publication activity of the co-users may automatically be updated. For example, if the user adds a new co-user to the user's co-user list, information associated with the new co-user's content publication activity (e.g., an index of the new co-user's content publication activity) may automatically be added to the information accessed by host 1130 during operation 1635. Similarly, if the user deletes an old co-user from the user's co-user list, information associated with the old co-user's content publication activity (e.g., an index of the new co-user's content publication activity) may automatically be removed from the information accessed by host 1130 during operation 1635.

As discussed above, content publication activity may include feeds from third party service provider accounts, such as, for example, a MySpace feed that provides information related to recent content publication activity within a co-user's MySpace profile. However, content publication activity also may include feeds from other third parties, such as, for example, a web site or publication (e.g., The New York Times web site). The third party web site or publication feed may be included in content publication activity of a particular co-user if the co-user has subscribed to the third party feed. In some implementations, some (or all) of the information included in the third party feed may be excluded from the information accessed by host 1130 in operation 1635. This may be the case because the information included in the third party feed is generic and a search of the third party feed information may not provide a user with information that is specific to co-users who are known to the user. However, in some cases, if the co-user who subscribes to the third party feed has actually viewed or bookmarked an item included in the third party feed (e.g., a particular article published by The New York Times web site), that item may be included in the information accessed by host 1130 because the item was actually of interest to the co-user.

Host 1130 identifies content publication activities that relate to the query based on the accessed information (1640). In some implementations, the host 1130 also may identify information other than content publication activity, such as, for example, instant message transcripts, that relates to the query based on accessed information that includes the other information (e.g., the instant message transcripts).

In an implementation where the host 1130 accesses an index of content publication activity for the identified co-users, host 1130 applies the query against the index. In this way, host 1130 identifies content publication activity having a keyword that is the same as, or similar to, the query. In the current example, host 1130 identifies content publication activity having the phrase "crème brulee" as a keyword.

In an implementation where the host 1130 directly accesses content associated with the content publication activities of the identified co-users, host 1130 may search the content for the query. In the present example, host 1130 identifies content publication activity that includes content related to "crème brulee."

Host 1130 provides an indication of the identified content publication activities, and an indication of co-users associated with the content publication activities, to the client 1110 (1645). Host 1130 may provide the indications to the client 1110 via the network 1120. An indication of the identified content publication activities may include a link or other identifier that represents the content publication activity and enables the user to access the content publication activity.

Once host 1130 identifies content publication activity that is related to the query, the host 1130 may identify co-users that have published the identified content publication activity. An indication of the co-users, such as, for example, screen names or identifiers associated with the co-users, may be provided by the host 1130 to the client 1110. The indications may be provided by the host 1130 to the client 1110 via the network 1120. For example, and as shown in GUI 1300 of FIG. 13, content publication activity including two blog posts published by co-user RockingRocky and three images published by co-user SingingCindy may be identified by host 1130 and an indication of which may be provided by host 1130 to client 1110 via network 1120.

Client 1110 receives the indications of the content publication activities and the associated co-users from host 1130 (1650). Client 1110 enables the user to perceive the indications of the content publication activities and associated co-users as search results for the query (1655). Enabling the user to perceive the indications may include presenting the indications to the user as search results in a GUI, such as, for example, one of GUI 1300 or GUI 1400. As discussed above, the search results may be organized in a variety of ways, such as, for example, by co-user associated with the content publication activities, by type of content publication activity, or in some other manner (e.g., by relevance to the query, by recency of publication, or by co-user group).

In some implementations, a user may be enabled to direct questions to one or more co-users who are known to the user. For example, the user may ask "Where can I get a decent bagel in Washington, D.C.?" The user may direct the question to all co-users known to the user (e.g., all co-users included in a co-user list owned by the user) or a subset of the co-users known to the user (e.g., a particular group of co-users named "Ex-NYers" or a list of particular co-users that includes co-users named "NY4Ever" and "BagelsNLox"). The co-users who receive the question may respond to the user by stating, for example, "Brooklyn Bagels in Arlington is the best place I've found."

As questions are asked and answered between the user and co-users known to the user, the questions and answers may be stored in a question and answer ("Q&A") database that is associated with the user. In some implementations, when the user provides a query to search content publication activity (or instant message transcripts), the Q&A database also may be searched to identify questions and answers that are related to the query.

Additionally, as a particular co-user engages in content publication activity and answers questions directed by the user or other co-users known to the particular co-user, topics (and categories of topics) that are of interest to the particular co-user, and about which the particular co-user has knowledge, may be identified. At a point at which a particular co-user has become associated with more than a threshold degree of content publication activity related to a topic, the particular co-user may be deemed to have an expertise in the topic. For example, the particular co-user may have published or updated more than a threshold number of digital assets that are determined to be related to the topic. More particularly, determination that the particular co-user is an expert in the topic may be based on (1) a degree of specificity to which the content publication activity is related to the topic, (2) topical similarity of locations (e.g., web pages, blogs, bulletin boards) to which content publication activity related to the topic is directed (e.g., published), (3) an amount of content publication activity related to the topic over a relatively long period of time (e.g., to ensure true expertise by the particular co-user in the topic, rather than a single experience with the topic), (4) a high degree of quality (e.g., thoughtfulness and insightfulness) of a relatively small number of content publication activities related to the topic, and (5) other information associated with the particular co-user that demonstrates an expertise in the topic (e.g., instances of the particular co-user answering questions related to the topic, a job or experience (e.g., authoring a web page, article, or book) held by the particular co-user related to the topic, or a degree of trust by others in the particular co-user's expertise in the topic).

For example, co-user RockingRocky may be deemed to be an expert on vacationing in Western Europe. Co-user RockingRocky may be so identified because (1) co-user RockingRocky has engaged in more than a threshold degree of content publication activity related to vacationing in Western Europe (e.g., publication of a large number of photographs showing vacation spots in Western Europe, blog entries describing trips to Western Europe, and answers to questions posed by others known to co-user RockingRocky about where to stay when visiting Western Europe), (2) co-user RockingRocky's content publication activity related to Western European vacations has been organized by co-user RockingRocky to include detailed tags for each content publication activity (e.g., a photograph entitled "The Seine in Paris," a blog entry entitled "Great gelato place in Florence," and a map pinpointing all of the places co-user RockingRocky visited in Spain."), (3) a majority of the web pages, blogs, and photograph albums to which co-user RockingRocky published content are associated with vacationing, travel, and Western Europe, (4) the content publication activity by co-user RockingRocky related to Western European vacations spans more than five years, (5) co-user RockingRocky has published articles in the Washington Post related to traveling in Western Europe, and (6) other users known to co-user RockingRocky trust the opinions and information provided by co-user RockingRocky on vacationing in Western Europe.

Once a particular co-user has been identified as an expert in a topic, future questions posed by others who are known to the particular co-user that are determined to be related to the topic may be sent directly to the particular co-user for answering. The particular co-user may receive questions related to the topic in addition to, or instead of, the questions being made available to all (or a user-specified subset of) co-users known to the user who poses the question. Additionally, the particular co-user's status as an expert in the topic may be indicated by an icon or other display characteristic associated with the particular co-user's name in a co-user list in which the co-user's name appears. The particular co-user's status as an expert in the topic also may be indicated in association with search results that include content publication activity associated with the particular co-user, in a user profile associated with the particular co-user, or within a instant message communications display when the particular co-user is engaging in an instant messaging conversation with another user. The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer-implemented method for indicating recent content publication activity, the method comprising:
receiving from a publishing online identity an indication that the publishing online identity has engaged in recent content publication activity;

accessing, from a storage device, co-user online identifiers that are associated with the publishing online identity and that are included by the publishing online identity in a co-user list;

determining an identifier for a second online identity which is included in the co-user list;

determining, from publication preference information associated with the publishing online identity, whether the publishing online identity desires to share recent content publication activity engaged in by the publishing online identity with the second online identity; and based on having determined that the publishing online identity desires to share recent content publication activity engaged in by the publishing online identity with the second online identity, transmitting to the second online identity an indication that the publishing online identity has engaged in the recent content publication activity.

2. A computer-implemented method for indicating recent content publication activity, the method comprising:

receiving from a publishing online identity an indication that the publishing online identity has engaged in recent content publication activity, and an indication of an activity type associated with the recent content publication activity;

accessing, from a storage device, co-user online identifiers that are associated with the publishing online identity and that are included by the publishing online identity in a co-user list;

determining an identifier for a second online identity which is included in the co-user list;

determining, from publication preference information associated with the publishing online identity, whether the publishing online identity desires to share recent content publication activity of the activity type engaged in by the publishing online identity with the second online identity; and based on having determined that the publishing online identity desires to share recent content publication activity of the activity type engaged in by the publishing online identity with the second online identity, transmitting to the second online identity an indication that the publishing online identity has engaged in the recent content publication activity of the activity type.

3. A system for indicating recent content publication activity, the system comprising:

one or more processing elements; and a computer memory storage system storing instructions that, when executed by one or more of the processing elements, cause the processing elements to:

receive from a publishing online identity an indication that the publishing online identity has engaged in recent content publication activity;

access co-user online identifiers that are associated with the publishing online identity and that are included by the publishing online identity in a co-user list;

determine an identifier for a second online identity which is included in the co-user list;

determine, from publication preference information associated with the publishing online identity, whether the publishing online identity desires to share recent content publication activity engaged in by the publishing online identity with the second online identity; and based on having determined that the publishing online identity desires to share recent content publication activity engaged in by the publishing online identity with the second online identity, transmit to the second online identity an indication that the publishing online identity has engaged in the recent content publication activity.

4. A system for indicating recent content publication activity, the system comprising:

one or more processing elements; and a computer memory storage system storing instructions that, when executed by one or more of the processing elements, cause the processing elements to:

receive from a publishing online identity an indication that the publishing online identity has engaged in recent content publication activity, and an indication of an activity type associated with the recent content publication activity;

access co-user online identifiers that are associated with the publishing online identity and that are included by the publishing online identity in a co-user list;

determine an identifier for a second online identity which is included in the co-user list;

determine, from publication preference information associated with the publishing online identity, whether the publishing online identity desires to share recent content publication activity of the activity type engaged in by the publishing online identity with the second online identity; and based on having determined that the publishing online identity desires to share recent content publication activity of the activity type engaged in by the publishing online identity with the second online identity, transmit to the second online identity an indication that the publishing online identity has engaged in the recent content publication activity of the activity type.

5. The method of claim 1 further comprising:

receiving information that indicates an activity type associated with the recent content publication activity; and selecting a display representation of the activity type for transmitting to the second online identity.

6. The method of claim 1, wherein determining whether the publishing online identity desires to share recent content publication activity with the second online identity includes:

determining that the publication preference information includes an indication that the publishing online identity desires to share recent content publication activity with a particular class of online identities to which the second online identity belongs.

7. The method of claim 1 wherein determining whether the publishing online identity desires to share recent content publication activity engaged in by the publishing online identity includes:

determining that the publication preference information includes a content publication activity type that is the same as the type engaged in by the publishing online identity; or comparing content associated with the recent content publication activity with content stored in the publication preference information.

8. The method of claim 1 wherein receiving an indication that the publishing online identity has engaged in recent content publication activity includes:

receiving an indication that the publishing online identity has engaged in creation of at least one of a digital asset, a communication tool, and a community-related asset.

9. The method of claim 1 wherein receiving an indication that the publishing online identity has engaged in recent content publication activity includes:

receiving an indication that the publishing online identity has performed an addition, deletion, or change to a digital asset, a communication tool, or a community-related asset.

10. The method of claim 1 wherein receiving an indication that the publishing online identity has engaged in recent content publication activity includes:
receiving an indication that the publishing online identity has engaged in creation of, or an update to, a third party service provider account owned by the publishing online identity.

11. The method of claim 1 further comprising enabling other online identities to search for recent content publication activity associated with the publishing online identity by providing at least one of a desired type of recent content publication activity, an identifier associated with recent content publication activity, and a keyword associated with the recent content publication activity.

12. The method of claim 2, wherein determining whether the publishing online identity desires to share recent content publication activity with the second online identity includes:
determining that the publication preference information includes an indication that the publishing online identity desires to share recent content publication activity with a particular class of online identities to which the second online identity belongs.

13. The method of claim 2 wherein determining whether the publishing online identity desires to share recent content publication activity engaged in by the publishing online identity includes:
determining that the publication preference information includes a content publication activity type that is the same as the type engaged in by the publishing online identity; or
comparing content associated with the recent content publication activity with content stored in the publication preference information.

14. The method of claim 2 wherein receiving an indication that the publishing online identity has engaged in recent content publication activity includes:
receiving an indication that the publishing online identity has engaged in creation of at least one of a digital asset, a communication tool, and a community-related asset.

15. The method of claim 2 wherein receiving an indication that the publishing online identity has engaged in recent content publication activity includes:
receiving an indication that the publishing online identity has performed an addition, deletion, or change to a digital asset, a communication tool, or a community-related asset.

16. The method of claim 2 wherein receiving an indication that the publishing online identity has engaged in recent content publication activity includes:
receiving an indication that the publishing online identity has engaged in creation of, or an update to, a third party service provider account owned by the publishing online identity.

17. The method of claim 2 wherein the activity type associated with the recent content publication activity includes creation of at least one of a user profile, an online journal, a blog, a playlist, a photograph album, and an account associated with a third party service provider.

18. The method of claim 2 wherein the activity type associated with the recent content publication activity includes an update to at least one of a user profile, an online journal entry, a blog entry, a playlist, a photograph album, and an account associated with a third party service provider.

19. The method of claim 2 further comprising:
transmitting to the second online identity a display representation of the activity type, including at least one of an image, an animation, a sound, a pop-up, text, scrolling text, and a scrolling image.

20. The method of claim 2 further comprising selectively enabling other online identities to view the recent content publication activity by manipulating the display representation.

21. The method of claim 2 further comprising enabling other online identities to search for recent content publication activity associated with the publishing online identity by providing at least one of a desired type of recent content publication activity, an identifier associated with recent content publication activity, and a keyword associated with the recent content publication activity.

22. The method of claim 5 wherein the activity type associated with the recent content publication activity includes creation of at least one of a user profile, an online journal, a blog, a playlist, a photograph album, and an account associated with a third party service provider.

23. The method of claim 5 wherein the activity type associated with the recent content publication activity includes an update to at least one of a user profile, an online journal entry, a blog entry, a playlist, a photograph album, and an account associated with a third party service provider.

24. The method of claim 6 wherein the particular class includes online identities other than the second online identity that are identified in a selection by the publishing online identity.

25. The method of claim 6 wherein the particular class includes particular online identities identified in a selection by the publishing online identity.

26. The method of claim 8 wherein receiving an indication that the publishing online identity has engaged in recent content publication activity includes:
receiving an indication that the publishing online identity has engaged in creation of a digital asset that includes an electronic file associated with the publishing online identity.

27. The method of claim 8 wherein receiving an indication that the publishing online identity has engaged in recent content publication activity includes:
receiving an indication that the publishing online identity has engaged in creation of a communication tool that includes an electronic implement used by the publishing online identity to communicate with other online identities and engage in social networking,
wherein social networking occurs if the publishing online identity communicates with other online identities, views digital assets associated with other online identities, or shares digital assets with other online identities.

28. The method of claim 8 wherein receiving an indication that the publishing online identity has engaged in recent content publication activity includes:
receiving an indication that the publishing online identity has engaged in creation of a community-related asset that includes content shared among the publishing online identity and other online identities.

29. The method of claim 14 wherein receiving an indication that the publishing online identity has engaged in recent content publication activity includes:
receiving an indication that the publishing online identity has engaged in creation of a digital asset associated with the publishing online identity.

30. The method of claim 14 wherein receiving an indication that the publishing online identity has engaged in recent content publication activity includes:
- receiving an indication that the publishing online identity has engaged in creation of a communication tool that includes an electronic implement used by the publishing online identity to communicate with other online identities and engage in social networking,
- wherein social networking occurs if the publishing online identity communicates with other online identities, views digital assets associated with other online identities, or shares digital assets with other online identities.

31. The method of claim 14 wherein receiving an indication that the publishing online identity has engaged in recent content publication activity includes:
- receiving an indication that the publishing online identity has engaged in creation of a community-related asset that includes content shared among the publishing online identity and other online identities.

32. The method of claim 23 further comprising:
- transmitting to the second online identity a display representation of the activity type, including at least one of an image, an animation, a sound, a pop-up, text, scrolling text, and a scrolling image.

33. The method of claim 32 further comprising selectively enabling other online identities to view the recent content publication activity by manipulating the display representation.

* * * * *